US012579477B2

(12) United States Patent
Sharma et al.

(10) Patent No.: US 12,579,477 B2
(45) Date of Patent: Mar. 17, 2026

(54) FEATURE SELECTION USING FEEDBACK-ASSISTED OPTIMIZATION MODELS

(71) Applicant: PayPal, Inc., San Jose, CA (US)

(72) Inventors: Nitin S. Sharma, San Jose, CA (US); Niraj Kumar, Edinburgh (GB)

(73) Assignee: PayPal, Inc., San Jose, CA (US)

( * ) Notice: Subject to any disclaimer, the term of this patent is extended or adjusted under 35 U.S.C. 154(b) by 974 days.

(21) Appl. No.: 17/475,901

(22) Filed: Sep. 15, 2021

(65) Prior Publication Data

US 2022/0374784 A1 Nov. 24, 2022

Related U.S. Application Data

(60) Provisional application No. 63/187,269, filed on May 11, 2021.

(51) Int. Cl.
*G06N 10/00* (2022.01)
*G06F 18/21* (2023.01)
(Continued)

(52) U.S. Cl.
CPC ......... *G06N 20/20* (2019.01); *G06F 18/2113* (2023.01); *G06F 18/214* (2023.01); *G06F 18/217* (2023.01); *G06N 10/00* (2019.01)

(58) Field of Classification Search
CPC ......... G06N 20/20; G06N 10/00; G06N 3/084
See application file for complete search history.

(56) References Cited

U.S. PATENT DOCUMENTS

2010/0220906 A1    9/2010   Abramoff et al.
2013/0232140 A1    9/2013   Ishii
(Continued)

OTHER PUBLICATIONS

Wang, Zhichun et al.; "A multi-objective evolutionary algorithm for feature selection based on mutual information with a new redundancy measure"; Feb. 2015; Elsevier; Information Sciences 307 (2015); 73-88 (Year: 2015).*
(Continued)

*Primary Examiner* — David Yi
*Assistant Examiner* — Ezra J Baker
(74) *Attorney, Agent, or Firm* — Kowert, Hood, Munyon, Rankin & Goetzel, P.C.

(57) ABSTRACT

Techniques are disclosed relating to feature selection based on feedback-assisted optimization models. In various embodiments, for example, the disclosed techniques include accessing a training dataset that includes a plurality of data samples that include data values for a plurality of features, and a set of labels corresponding to the plurality of data samples. In some embodiments, a computer system performs feature-selection operations to select, from the plurality of features, a subset of features to include in a reduced feature set. For example, in some embodiments the feature-selection operations include processing the training dataset based on an optimization model, where an objective function utilized in the optimization model utilizes performance feedback information corresponding to machine learning models that are trained based on candidate feature sets. Based on the feature-selection operation, the computer system may generate an output value that indicates the subset of features to include in the reduced feature set.

20 Claims, 16 Drawing Sheets

(51) Int. Cl.

| | |
|---|---|
| *G06F 18/2113* | (2023.01) |
| *G06F 18/214* | (2023.01) |
| *G06N 5/01* | (2023.01) |
| *G06N 10/60* | (2022.01) |
| *G06N 20/00* | (2019.01) |
| *G06N 20/20* | (2019.01) |

(56) References Cited

U.S. PATENT DOCUMENTS

| | | | |
|---|---|---|---|
| 2016/0203600 | A1 | 7/2016 | Abdolell et al. |
| 2017/0011534 | A1 | 1/2017 | Costa et al. |
| 2018/0039911 | A1 | 2/2018 | Bezzubtseva et al. |
| 2018/0276555 | A1 | 9/2018 | Weichenberger |
| 2019/0304568 | A1 | 10/2019 | Wei et al. |
| 2020/0074401 | A1 | 3/2020 | Oliveira Almeida et al. |
| 2021/0033282 | A1 | 2/2021 | Qiao et al. |
| 2021/0319906 | A1 | 10/2021 | Hafez et al. |
| 2022/0058211 | A1 | 2/2022 | Wismüller |
| 2022/0072425 | A1 | 3/2022 | Orlandi et al. |
| 2022/0083910 | A1 * | 3/2022 | Tomoda ................ G06F 21/554 |
| 2022/0091915 | A1 | 3/2022 | Perneti et al. |

OTHER PUBLICATIONS

Jan, Muhammad et al.; "A New Threshold Based Penalty Function Embedded MOEA/D"; Feb. 2016; International Journal of Advanced Computer Science and Applications vol. 7 No. 2; 647-655 (Year: 2016).*

Chen, Lin et al.; "Embedded Supervised Feature Selection for Multi-class Data"; 2017; SIAM; Proceedings of the 2017 SIAM International Conference on Data Mining; 516-524 (Year: 2017).*

Chen, Zhao et al.; "GradNorm: Gradient Normalization for Adaptive Loss Balancing in Deep Multitask Networks"; 2018; PMLR; Proceedings of the 35th International Conference on Machine Learning; 1-10 (Year: 2018).*

Rashid, A.N.M. et al.; "A Novel Penalty-Based Wrapper Objective Function for Feature Selection in Big Data Using Cooperative Co-Evolution"; Aug. 2020; IEEE; IEEE Access vol. 8; 150113-150129 (Year: 2020).*

Mandal, Ashis et al.; "An Approach to Feature Subset Selection Using Simulated Quantum Annealing"; Aug. 2020; Springer; Data Management, Analytics, and Innovation, Advances in Intelligent Systems and Computing 1174; 133-146 (Year: 2020).*

Nembrini, Riccardo et al.; "Feature Selection for Recommender Systems with Quantum Computing"; Jul. 2021; MDPI; entropy 2021, 23, 970; 1-22 (Year: 2021).*

Rasoul, Sali et al.; "Feature Selection Using Reinforcement Learning"; Jan. 2021; arXiv; 1-7 (Year: 2021).*

Milne et al., "Optimal feature selection in credit scoring and classification using a quantum annealer," White Paper; © 2017 1QB Information Technologies, 19 pages.

Glover et al., "A Tutorial on Formulating and Using QUBO Models," Computer Science, Mathematics, Physics ArXiv; May 2019, 53 pages.

Binary optimization—Azure Quantum | Microsoft Docs; Feb. 1, 2021; https://docs.microsoft.com/en-us/azure/quantum/optimization-binary-opt; 3 pages. [Retrieved May 7, 2021].

Mukherjee et al., "CCMI : Classifier based Conditional Mutual Information Estimation," arXiv:1906.01824v1 [cs.LG] Jun. 5, 2019; 17 pages.

Beraha et al., "Feature Selection via Mutual Information: New Theoretical Insights," arXiv:1907.07384v1 [cs.LG] Jul. 17, 2019; 8 pages.

Tanahashi et al., "Global Mutual Information Based Feature Selection By Quantum Annealing," Apr. 11, 2018; Recruit Communications; 25 pages.

Brownlee et al., "Information Gain and Mutual Information for Machine Learning," last Updated on Dec. 10, 2020; https://machinelearningmastery.com/information-gain-and-mutual-information/; 15 pages. [Retrieved Jul. 1, 2021].

Booth et al., "Partitioning Optimization Problems for Hybrid Classical/Quantum Execution," Technical Report; Jan. 9, 2017; 14-1006A-A, D-Wave Technical Report Series, 13 pages.

Rodriguez-Lujan et al., "Quadratic Programming Feature Selection," Journal of Machine Learning Research 11 (2010) 1491-1516; Submitted Jun. 2009; Revised Nov. 2009; Published Apr. 2010.

Von Dollen et al., "Quantum-Assisted Feature Selection for Vehicle Price Prediction Modeling," arXiv:2104.04049v1 [cs.LG] Apr. 8, 2021; 7 pages.

Liu et al., "Quantum-Based Feature Selection for Multiclassification Problem in Complex Systems with Edge Computing," Hindawi, Complexity, vol. 2020, Article ID 8216874, 12 pages; https://doi.org/10.1155/2020/8216874.

Date et al., "QUBO Formulations for Training Machine Learning Models, " equalarXiv:2008.02369v1 [cs.LG] Aug. 5, 2020; 7 pages.

Kochenberger et al., "The unconstrained binary quadratic programming problem: a survey," J Comb Optim (2014) 28:58-81, OI 10.1007/s10878-014-9734-0; Published online: Apr. 18, 2014; 24 pages.

Lazecka M., et al., "Analysis of Information-Based Nonparametric Variable Selection Criteria," Entropy, Aug. 31, 2020, vol. 22, No. 9, 974, 18 pages.

Mandal A., et al., "An Approach of Feature Subset Selection Using Simulated Quantum Annealing," Aug. 19, 2020.

Milne A., et al., "Optimal Feature Selection in Credit Scoring and Classification Using a Quantum Annealer," 2017.

Nayak S.K., et al., "Elitism Based Multi-Objective Differential Evolution for Feature Selection: A Filter Approach with an Efficient Redundancy Measure," Journal of King Saud University, Computer and information sciences, vol. 32. No. 2, 2020, pp. 174-187.

Rashid, A.N.M. et al., "A Novel Penalty-Based Wrapper Objective Function for Feature Selection in Big Data Using Cooperative Co-Evolution," Aug. 14, 2020.

Tan C J., et al.,"A Multi-objective Evolutionary Algorithm-based Ensemble Optimizer for Feature Selection and Classification with Neural Net Work Models," Neurocomputing, Jul. 11, 2013, 12 pages.

Wang Z., et al., "A Multi-objective Evolutionary Algorithm for Feature Selection Based on Mutual Information with a New Redundancy Measure," Feb. 21, 2015.

* cited by examiner

<u>200</u>

Training Dataset <u>110</u>

| Data Sample | Feature Vector | Label |
|---|---|---|
| Data Sample <u>112A</u> | Feature Vector <u>202A</u> | <u>Label 204A</u> |
| Data Sample <u>112B</u> | Feature Vector <u>202B</u> | <u>Label 204B</u> |
| Data Sample <u>112C</u> | Feature Vector <u>202C</u> | <u>Label 204C</u> |
| . . . | . . . | . . . |
| Data Sample <u>112N</u> | Feature Vector <u>202N</u> | <u>Label 204N</u> |

| Feature Vector | Feature 302A | Feature 302B | Feature 302C | ··· |
|---|---|---|---|---|
| Feature Vector 202A | Value 1A | Value 1B | Value 1C | ··· |
| Feature Vector 202B | Value 2A | Value 2B | Value 2C | ··· |
| Feature Vector 202C | Value 3A | Value 3B | Value 3C | ··· |
| ⋮ | ⋮ | ⋮ | ⋮ | |
| Feature Vector 202N | Value NA | Value NB | Value NC | ··· |

Feature Vector 202A:    [15.25, U.S., 06:15:57, FALSE, ...]
Feature Vector 202B:    [87.93, India, 11:47:32, TRUE, ...]
Feature Vector 202C:    [163.09, China, 15:36:08, TRUE, ...]
          ⋮                        ⋮

$$D = \begin{bmatrix} 15.25 & U.S. & 06:15:57 & FALSE & \cdots \\ 87.93 & India & 11:47:32 & TRUE & \cdots \\ 163.09 & China & 15:36:08 & TRUE & \cdots \\ \vdots & \vdots & \vdots & \vdots & \end{bmatrix}$$

Feature 302A   Feature 302B   Feature 302C   Feature 302D

$$\text{Labels } \underline{204}: \quad C = \begin{bmatrix} 1 \\ 0 \\ 0 \\ \vdots \end{bmatrix}$$

$$\text{Reduced Feature Set Information 114:} \quad X = \begin{bmatrix} 0 \\ 1 \\ 1 \\ 0 \\ \vdots \end{bmatrix}$$

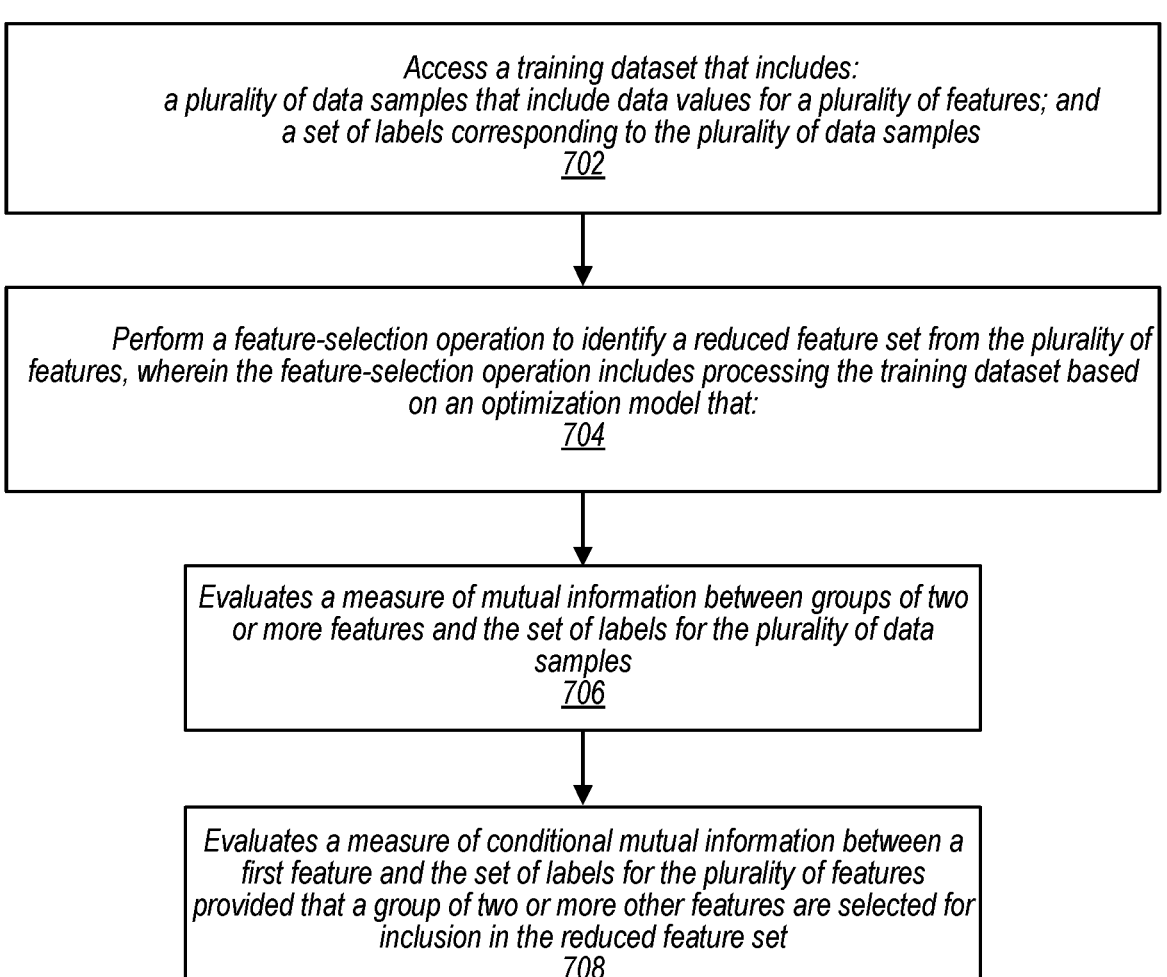

Access a training dataset that includes:
a plurality of data samples that include data values for a plurality of features; and
a set of labels corresponding to the plurality of data samples
<u>702</u>

Perform a feature-selection operation to identify a reduced feature set from the plurality of features, wherein the feature-selection operation includes processing the training dataset based on an optimization model that:
<u>704</u>

Evaluates a measure of mutual information between groups of two or more features and the set of labels for the plurality of data samples
<u>706</u>

Evaluates a measure of conditional mutual information between a first feature and the set of labels for the plurality of features provided that a group of two or more other features are selected for inclusion in the reduced feature set
<u>708</u>

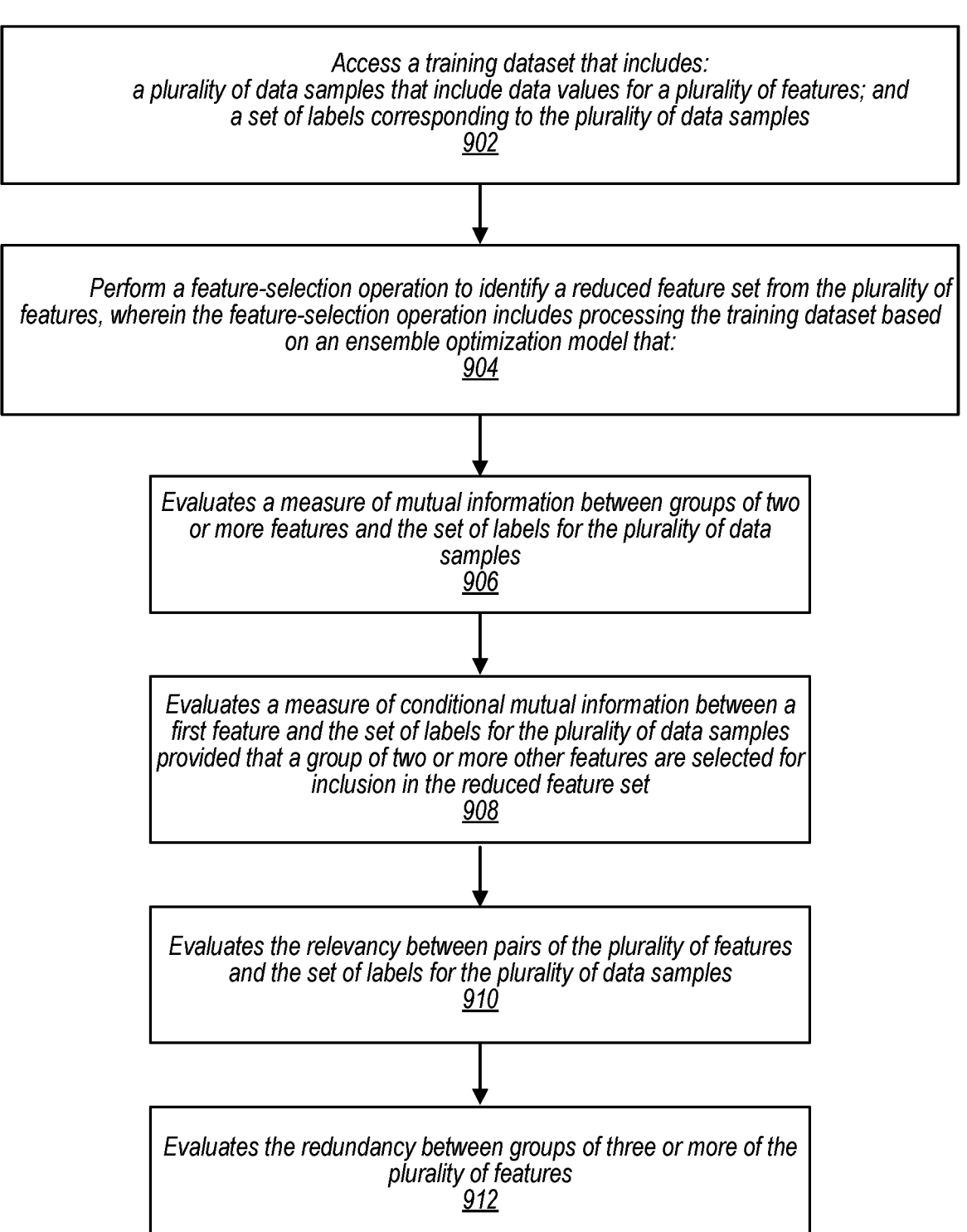

Access a training dataset that includes:
a plurality of data samples that include data values for a plurality of features; and
a set of labels corresponding to the plurality of data samples
_902_

Perform a feature-selection operation to identify a reduced feature set from the plurality of features, wherein the feature-selection operation includes processing the training dataset based on an ensemble optimization model that:
_904_

Evaluates a measure of mutual information between groups of two or more features and the set of labels for the plurality of data samples
_906_

Evaluates a measure of conditional mutual information between a first feature and the set of labels for the plurality of data samples provided that a group of two or more other features are selected for inclusion in the reduced feature set
_908_

Evaluates the relevancy between pairs of the plurality of features and the set of labels for the plurality of data samples
_910_

Evaluates the redundancy between groups of three or more of the plurality of features
_912_

_FIG. 9_

1000

Figure 11:
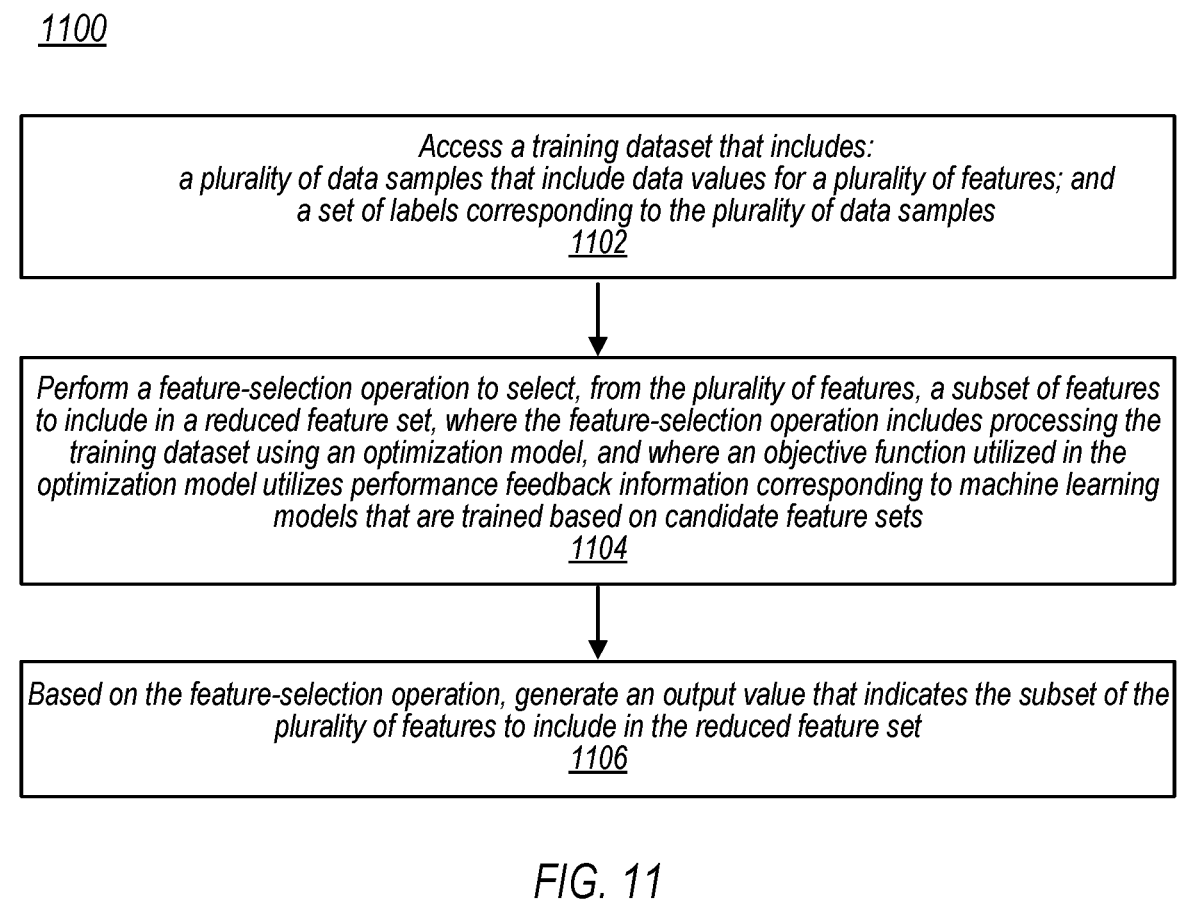

1100

Access a training dataset that includes:
a plurality of data samples that include data values for a plurality of features; and
a set of labels corresponding to the plurality of data samples
1102

Perform a feature-selection operation to select, from the plurality of features, a subset of features to include in a reduced feature set, where the feature-selection operation includes processing the training dataset using an optimization model, and where an objective function utilized in the optimization model utilizes performance feedback information corresponding to machine learning models that are trained based on candidate feature sets
1104

Based on the feature-selection operation, generate an output value that indicates the subset of the plurality of features to include in the reduced feature set
1106

Access a training dataset that includes:
a plurality of data samples that include data values for a plurality of features; and
a set of labels corresponding to the plurality of data samples
<u>1302</u>

Process the training dataset based on an optimization model to generate weighting values for the plurality of features, where the processing the training dataset includes using quantum annealing to determine a minimization of an objective function utilized in the optimization model, where the minimization of the objective function corresponds to an output value that indicates the weighting values for the plurality of features
<u>1304</u>

FEATURE SELECTION USING FEEDBACK-ASSISTED OPTIMIZATION MODELS

CROSS-REFERENCE TO RELATED APPLICATIONS

This application claims benefit of priority to U.S. Provisional Patent Application Ser. No. 63/187,269, filed on May 11, 2021, which is hereby incorporated by reference as if entirely set forth herein. This application is also related to U.S. patent application Ser. No. 17/475,837 filed on Sep. 15, 2021 and U.S. patent application Ser. No. 17/476,001 filed on Sep. 15, 2021, both of which are hereby incorporated by reference as if entirely set forth herein.

BACKGROUND

Technical Field

This disclosure relates generally to data science and machine learning, and more particularly to techniques that utilize optimization models for feature-selection.

Description of the Related Art

The feature-selection process, utilized in machine learning projects, includes selecting, from a set of available features of data samples included in a training dataset, a subset of features to use in the construction of a machine learning model. The feature-selection process aims to reduce the number of data features included in the training dataset, which may provide various improvements to the training process (e.g., reducing the training time) and the resulting machine learning models (e.g., improving the accuracy of the model, reducing overfitting, etc.). Feature selection presents various technical problems, however. For example, as will be appreciated by one of skill in the art with the benefit of this disclosure, it is often difficult to identify the interactive effects between larger combinations of candidate features for the reduced feature set as these "higher-order" interactions are often masked by "lower-order" interactions between smaller combinations of features.

BRIEF DESCRIPTION OF THE DRAWINGS

FIG. 2 is a block diagram illustrating an example representation of a training dataset, according to some embodiments.

FIG. 3A is a block diagram illustrating example data samples that may be included in a training dataset, according to some embodiments. FIG. 3B is a block diagram illustrating example feature vectors corresponding to various data samples, according to some embodiments. FIG. 3C is a block diagram illustrating an example matrix that includes the feature vectors corresponding to various data samples, according to some embodiments. FIG. 3D is a block diagram illustrating a set of labels for data samples included in a training dataset. FIG. 3E is a block diagram illustrating an example representation of reduced feature set information, according to some embodiments.

FIG. 7 a flow diagram illustrating an example method for performing feature-selection based on a multi-term mutual information optimization model, according to some embodiments.

FIG. 9 is a flow diagram illustrating an example method for performing feature-selection based on a hybrid optimization model, according to some embodiments.

FIG. 11 is a flow diagram illustrating an example method for performing feature-selection based on a feedback-assisted optimization model, according to some embodiments.

FIG. 13 is a flow diagram illustrating an example method for performing feature-selection based on a feature-ranking-based optimization model, according to some embodiments.

DETAILED DESCRIPTION

Figure 1:
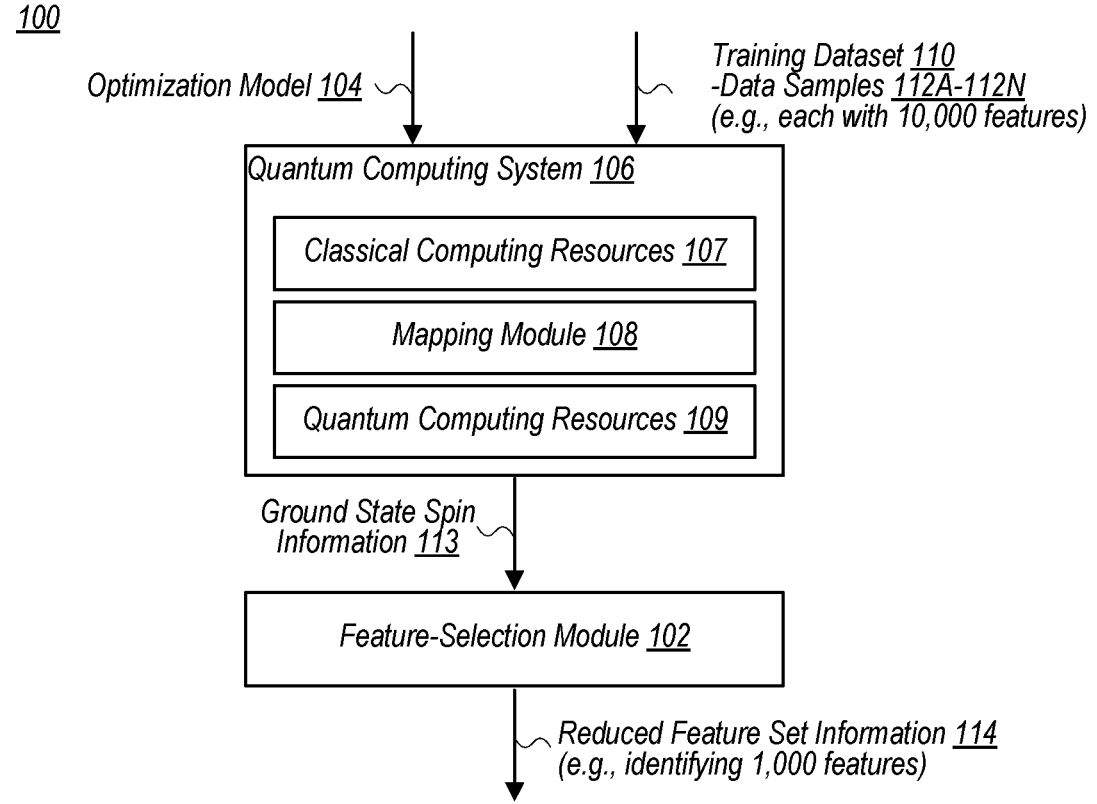
FIG. 1 is a block diagram illustrating an example feature-selection module and quantum computing system, according to some embodiments.

In the context of data science and machine learning, "feature-selection" refers to the process of selecting, from a set of available features, a subset of features to use in the construction of a predictive model (such as a machine learning model). As will be appreciated by one of skill in the art, the term "data feature" (or simply "feature") as used herein refers to an attribute of a data sample, such as a data sample included in a training dataset used to train a machine learning model. Generally speaking, the feature-selection process aims to reduce the number of data features included in the training data used to train the model, for example by removing irrelevant or redundant features, while retaining those features that are beneficial to the performance of the model. Reducing the number of features used to train a machine learning model may present various technical benefits, such as improving the accuracy of the model, reducing redundancy in the training dataset used to train the model, shortening the training time, reducing overfitting, and allowing better understanding of the data features that affect the output of the model. Consider, as one non-limiting example, an embodiment in which a machine learning model is used (e.g., by a provider of web services) to assess the risk of activity associated with user accounts. In such an embodiment, utilizing the feature-selection process to reduce redundancy in a training dataset can present various improvements to the machine learning model trained on such a dataset, for example by enabling the model to more accurately identify account takeover activity, fraudulent activity, or various other types of potentially malicious user activity.

Feature-selection can be viewed as a combinatorial optimization problem in which the goal is to identify the optimal combination of features, for a training dataset, to generate a predictive model. Solving this optimization problem often includes minimizing (or, depending on the implementation, maximizing) an objective function used to evaluate the performance of a candidate combination of features. Traditional feature-selection techniques, such as recursive feature elimination, attempt to solve this optimization problem by iteratively reducing the number of features in the dataset while maximizing the performance of selected metrics.

The present disclosure relates to techniques that utilize optimization models, such as quadratic unconstrained binary optimization ("QUBO") models, for feature-selection. More specifically, various embodiments of the disclosed techniques relate to quantum models for feature-selection using the QUBO framework, modeling the combinatorial optimization problem of feature-selection as a QUBO problem having corresponding objective functions. As will be appreciated by one of skill in the art with the benefit of this disclosure, QUBO problems are a class of combinatorial optimization problems where the QUBO problem is defined, for an n×n matrix Q of values and a vector X of n binary values, as finding the vector X of binary values that minimizes the function:

$$f(x) = \sum_{i} Q_{ii} X_i + \sum_{i<j} Q_{ij} X_i X_j$$

or, written more concisely:

$$\min_{X \in \{0,1\}^n} X^T Q X$$

Applicant notes that one unique feature of QUBO problems, which are classified as NP hard problems, is that they may be solved by adiabatic quantum computers using quantum annealing. Accordingly, in various embodiments, the disclosed techniques enable the disclosed objective functions to be minimized (or maximized, according to some embodiments) using quantum annealing, where this minimization (or maximization) corresponds to a solution to the feature-selection problem and indicates a subset of features to include in a reduced feature set.

The disclosed techniques present various technical improvements to the feature-selection process. For example, in various embodiments, the disclosed feature-selection techniques may reduce the time required to complete the feature-selection process. For example, in various embodiments the disclosed quantum annealing-based techniques for selecting a reduced feature set may be less prone to getting stuck in the local minima solutions compared to the simulated annealing-based methods to solving the QUBO problems.

Further, in various embodiments, the disclosed feature-selection techniques may help discover combinations of features that would not have been discovered using prior feature-selection techniques. This, in turn, may improve the predictive power of models built on those feature sets, and may include features that enhance feature engineering libraries and APIs used in machine learning applications. As will be appreciated by one of skill in the art with the benefit of this disclosure, it is often difficult to discover interactions between larger numbers of variables (e.g., three or more variables). For example, in many instances these "higher-order interactions" are masked or confounded by lower-order effects. As such, it is often difficult to identify higher-order interactions between data features during feature-selection using prior feature-selection techniques. In various embodiments, the disclosed feature-selection techniques may be used to identify these higher-order interactions between larger numbers (e.g., three or more) of features, as described in more detail below with reference to FIGS. 4-13. As will be appreciated by one of skill in the art with the benefit of this disclosure, the discovery and inclusion of these larger combinations of features in a reduced feature set may provide various technical benefits. Consider, as one non-limiting example in the context of network security, an instance in which a machine learning model is used to identify account takeover ("ATO") attacks. In such instances, there may be multivariate, higher-order interactive effects between larger groups of different features that are incredibly relevant to distinguishing between ATO and non-ATO activity. Using the disclosed feature-selection techniques, various embodiments may facilitate discovery of these groups of features such that they may be included in a reduced feature set used to train a machine learning model, improving that model's ability to discover ATO attacks, according to some embodiments.

As described in detail below, the present disclosure presents various optimization models for use in the feature-selection process. First, this disclosure describes a multivariate effect-based optimization model that evaluates both a level of relevancy between the features and the labels for the data samples and a level of redundancy between the features. Second, this disclosure describes a multi-term, mutual information optimization model that utilizes an objective function that includes terms to evaluate mutual information contributions and conditional mutual information contributions from multiple features. Third, this disclosure presents an ensemble optimization model that combines aspects of multiple different optimization models. For example, in some embodiments the ensemble optimization model includes aspects of both the multivariate effect optimization model and the multi-term, mutual information optimization model. Fourth, this disclosure describes a feedback-assisted optimization model that utilizes performance feedback corresponding to machine learning models that are trained based on candidate feature sets to boost the performance of the optimization model. Fifth, this disclosure describes a feature ranking-based optimization model that, in some embodiments, generates weighting values that indicate a relative ranking of the importance of the features available for selection in a reduced feature set.

Referring now to FIG. 1, block diagram 100 depicts a feature-selection module 102 and a quantum computing system 106. In various embodiments, the quantum computing system 106 and the feature-selection module 102 are operable to perform a feature-selection operation based on one or more optimization models 104 (e.g., QUBO models) to select, from a (potentially large) set of features, a subset of features to include in a reduced feature set. For example, in the depicted embodiment, the quantum computing system 106 is provided with one or more optimization models 104 and a training dataset 110 that includes various data samples 112A-112N. In various embodiments, the data samples 112 may have data values for a large number of data features. In the depicted embodiment, for example, the data samples 112 in the training dataset 110 include 10,000 features, though this embodiment is provided merely as one non-limiting example and, in other embodiments, the data samples 112 may have any other suitable number of features.

In FIG. 1, quantum computing system 106 includes classical computing resources 107, mapping module 108, and quantum computing resources 109. As will be appreciated by one of skill in the art with the benefit of this disclosure, in various embodiments the quantum computing system 106 is operable to use the quantum computing resources 109 to determine solutions to complex optimization problems, such as QUBO problems, using quantum annealing. For example, in various embodiments, a feature-selection problem that is modeled using an optimization model 104 may be mapped, using mapping module 108, from this QUBO formulation to a target Hamiltonian representation, which indicates the state of evolution of the quantum system. As will be appreciated by one of skill in the art with the benefit of this disclosure, this mapping of the optimization model 104 to a target Hamiltonian enables the quantum computing system 106 to determine a solution to the QUBO problem, which, in various embodiments, is a feature-selection problem. For example, in this mapping process, the various parameters to be optimized in the optimization model 104 are mapped to the qubits of the quantum computing resources 109 and the qubits are initialized into initial ground states.

Through quantum annealing, the quantum computing system 106 is able to modify the states of these qubits simultaneously such that, when the computation is complete, the spin of each qubit is either a 0 or a 1. This ground state spin of the qubits corresponds to a solution to the original optimization problem—a feature-selection problem modeled using an optimization model 104, according to various embodiments. Stated differently, in various embodiments the quantum computing system 106 is operable to process the training dataset 110 based on the optimization model 104 using quantum annealing to determine the ground state spin information 113, which indicates the ground state spin of the various qubits in the quantum computing resources 109. Further, in various embodiments, the ground states of the qubits correspond to the values for the variables in the optimization model(s) 104. Accordingly, in various embodiments, a minimization of an objective function utilized in the optimization model 104 corresponds to a solution to the feature-selection problem and indicates the subset of features to include in a reduced feature set.

In various embodiments the feature-selection module 102 is operable to generate the reduced feature set information 114 based on the ground state spin information 113. For example, as noted above, in various embodiments the ground state spin information 113 indicates ground state spin—either a "0" or a "1"—of various qubits, which, in turn, correspond to the variables in the optimization model 104. As described in more detail below with reference to FIG. 3E, in various embodiments the reduced feature set information 114 includes a set of binary values (e.g., specified as a vector, for example) that act as variables for the various features and indicate whether their corresponding features are to be included in the reduced feature set. Stated differently, in various embodiments the values in the reduced feature set information 114 may be thought of as "weighting values" for their corresponding features, where a weighting value of 0 indicates that the corresponding feature is not to be included in the reduced feature set and a weighting value of 1 indicates that the corresponding feature is to be included in the reduced feature set.

As one non-limiting example, in various embodiments if the ground state spin of a first qubit, Qubit 1, is equal to 0, the feature-selection module 102 generates a value of 0 for a variable for a corresponding feature, Feature 1, in the training dataset 110, where a value of 0 for this variable indicates that the corresponding Feature 1 is not to be included in the reduced feature set. Similarly, if the ground state spin of a second qubit, Qubit 2, is equal to 1, in various embodiments the feature-selection module 102 generates a value of 1 for a variable for a corresponding feature, Feature 2, in the training dataset 110, where a value of 1 for this variable indicates that the corresponding Feature 2 is to be included in the reduced feature set.

Note that, in various embodiments, the number of features included in the reduced feature set may be significantly smaller than the total number of features present in the training dataset 110. In the non-limiting embodiment of FIG. 1, for example, the reduced feature set information 114 indicates 1000 of the original 10,000 features to include in the reduced feature set. In various embodiments, the reduced feature set indicated by reduced feature set information 114 may be used in the training of one or more machine learning models. For example, the reduced feature set information 114 may be used to determine which features to include in a training dataset, which in turn may be used to train one or more machine learning models.

The performance of the disclosed optimization models 104 for feature selection may be assessed using various suitable techniques. The following paragraphs present a discussion of various non-limiting model-assessment approaches that may be used, according to some embodiments, though other suitable techniques may also be employed. First, in various embodiments, performance of the optimization models 104 may be evaluated by training one or more machine learning models using a training dataset (e.g., training dataset 110 or a different training dataset) that includes data values only for the reduced feature set indicated by the reduced feature set information 114. In some such embodiments, for example, the selected reduced feature set may be used to train an ensemble of classifier models, including one or more of: a logistic regression classifier, random forest classifier, an artificial neural network (with one or more hidden layers, for example), gradient-boosted trees, eXtreme Gradient Boosting ("XGBoost"), etc. In various embodiments, this approach provides a robust evaluation of the optimization models 104 and whether the features selected by optimization model 104 are performing consistently well around the ensemble of evaluation methods.

Further, in some embodiments, both threshold agnostic measures (such as log-loss) and threshold sensitive measures (such as accuracy) may be considered in performance comparison of models 104. Additionally, apart from point-estimate assessment, confidence interval assessment may be used, which may include bootstrapping a test dataset and computing the assessment scores across each bootstrap. In some embodiments, the evaluation further includes investigating the run-time/number of iteration steps for the optimization models 104 to come within a particular percentage range of the "optimal" point estimate or overlap of the confidence interval, where the "optimal" is a baseline obtained using the traditional benchmark. Additionally, in some embodiments, a study of the convexity of the optimization landscape may be performed to understand how prone the quantum solution is to getting stuck in the local minima. Further, in some embodiments, the evaluation includes dissecting the solutions with an optimization model 104, for example by evaluating, with each iteration, how the optimization model 104 optimizes for the best subset of features.

In some embodiments this may include the Bartlett's test of sphericity or the chi-square test for independence. Additionally, in some embodiments, the evaluation process may include a thorough comparison of the optimization models 104 with the traditional feature selection methods. This may include comparing the traditional greedy methods as well as the classical simulated annealing approaches to solve the QUBO problems.

Turning now to FIG. 2, block diagram 200 depicts an example representation of training dataset 110, according to some embodiments. As noted above, in various embodiments the training dataset 110 may be used in the feature-selection process to identify a reduced feature set to use in training one or more machine learning models.

In the depicted embodiment, training dataset 110 includes data samples 112A-112N, each of which includes a corresponding feature vector 202A-202N and a label 204A-204N (respectively). As will be appreciated by one of skill in the art with the benefit of this disclosure, in various embodiments the data samples 112 may correspond to individual observations of a particular type of event, where the corresponding feature vectors 202 include a set of data values for one or more features (also referred to as "attributes") of the observations. Non-limiting examples of data samples 112 and feature vectors 202 are described below with reference to FIG. 3A-3C.

Labels 204, in various embodiments, are values used to indicate a particular class or category into which the corresponding data samples 112 have been assigned. As one non-limiting example, consider an instance in which the training dataset 110 corresponds to spam filtering and the data samples 112 correspond to individual emails that have been identified as either being "spam" or "not spam." In such an embodiment, the labels 204 may include data values used to indicate the category into which each data sample 112 has been classified. For example, labels 204, in this non-limiting example, may use a value of 0 to indicate that a given data sample 112 has been classified as "not spam" and a value of 1 to indicate that a given data sample 112 has been classified as "spam." As another non-limiting example, consider an instance in which the training dataset 110 corresponds to detecting fraudulent electronic transactions performed via an online payment service provided by a server system, where the data samples 112 correspond to prior electronic transactions and the labels 204 indicate the class to which the prior transaction belongs (e.g., "fraudulent" or "not fraudulent"). In this example, labels 204 may use a value of 0 to indicate that a given electronic transaction was classified as "not fraudulent" and a value of 1 to indicate that a given electronic transaction was classified as "fraudulent." Note, however, that these embodiments are provided merely as examples and are not intended to limit the scope of the present disclosure.

In the non-limiting example above, the training dataset 110 is described primarily with reference to training machine learning models that may be used to perform classification tasks (e.g., classifying an email as "spam" or "not spam"). Note, however, that these examples are note intended to limit the scope of the present disclosure and, in various embodiments, the training dataset 110 may be one used to train a regression model used to perform regression tasks (e.g., predicting the fuel efficiency (e.g., specified in miles-per-gallon) of a vehicle provided an input feature vector specifying various features of the vehicle). In some such embodiments, instead of indicating one of a set of classes into which a given data sample 112 was classified, the labels 204 may instead include a numerical value (e.g., an integer or floating-point number) or other type of value. Continuing with the non-limiting example in which the training dataset 110 is to be used (e.g., following the disclosed feature-selection operations) to train a regression model used to predict the fuel efficiency of a vehicle, the labels 204 may specify the fuel efficiency of the vehicles represented by the data samples 112.

Referring now to FIG. 3A, block diagram 300 depicts example feature vectors 202 corresponding to various data samples 112, according to some embodiments. As shown in FIG. 3A, each of the feature vectors 202A-202N includes a set of data values corresponding to the various features 302 in a training dataset 110. In FIG. 3A, each feature vector 202 is represented as a row in a table, where the columns of the table represent the individual features 302 of the feature vectors 202. Feature vector 202A, for example, includes data value 1A for feature 302A, value 1B for feature 302B, value 1C for feature 302C, etc. Note that, although only three different features 302A-302C are depicted in FIG. 3A for clarity, the feature vectors 202 for the data samples 112 in the training dataset 110 may include any suitable number of features 302A-302M (e.g., 1,000, 5,000, 10,000, etc.).

Note that, in various embodiments, the nature of the features 302 included in a feature vector 202 may vary depending on the nature of the data samples 112 and the training data 110. In one of the non-limiting embodiments discussed above, for example, in which the training dataset 110 corresponds to spam filtering, the features 302 correspond to attributes of the emails being classified as either "spam" or "not spam." Non-limiting examples of features 302 that may be used in such an instance include the IP address of the sending computer system, a time at which the email was sent, the country from which the email was sent, the presence of one or more keywords within the body of the email, whether the email includes any hyperlinks, etc.

In FIG. 3B, block diagram 310 depicts example feature vectors 202A-202C respectively corresponding to data samples 112A-112C, according to one non-limiting embodiment. More specifically, the non-limiting embodiment depicted in FIG. 3B corresponds to example in which the training dataset 110 is used to train one or more machine learning models to detect fraudulent (or otherwise malicious) electronic transactions performed or attempted via a server system that provides an online payment service. In such an embodiment, the features 302 may correspond to attributes of past electronic transactions that have been classified as "fraudulent" or "not fraudulent." In the non-limiting embodiment depicted in FIG. 3B, for example, feature 302A may correspond to an amount of the transaction, feature 302B may correspond to a country from which a request to perform the transaction originated, feature 302C may correspond to the time at which the transaction was performed, feature 302D may correspond to whether the request originated from a verified user device. Note, however, that these features 302 are provided merely as non-limiting examples and, in other embodiments, the features 302 may corresponds to any of various suitable attributes of the data samples 112.

In FIG. 3C, diagram 320 depicts a matrix D used to represent the feature vectors 202 of the various data samples 112 in the non-limiting example of training dataset 110 described above with reference to FIG. 3B. More specifically, the matrix D depicted in FIG. 3C includes N rows, one for each of the data samples 112A-112N in the training dataset 110 in the non-limiting example. Further, in FIG. 3C the matrix includes M columns, one for each of the features 302A-302M. Stated differently, FIG. 3C depicts an N-by-M matrix D of N feature vectors 202A-202N, each of which (potentially) includes data values for M features 302A-302M. Accordingly, the embodiment depicted in FIG. 3C provides one technique for representing the data values in the feature vectors 202 for the data samples 112 in a matrix rather than as a set of vectors.

In FIG. 3D, diagram 330 depicts a vector C used to represent the set of labels 204 for the various data samples 112. For example, in the depicted embodiment, the vector C includes the values of the set of labels 204 corresponding to the classes into which the various data samples 112 have been classified. In the depicted embodiment, for example, the first entry in the vector C (e.g., C[0]) indicates the label for data sample 112A (e.g., 1), the second entry (e.g., C[1]) indicates the label for data sample 112B (e.g., 0), and the third entry (e.g., C[2]) indicates the label for data sample 112C (e.g., 0).

In FIG. 3E, diagram 340 depicts reduced feature set information 114, according to one non-limiting embodiment. In various embodiments, reduced feature set information 114 includes a set of binary values (e.g., specified as a vector) that indicate which of the various features 302 are to be included in the reduced feature set. In FIG. 3E, diagram 340 depicts a vector X used to represent the values for binary variables $X_A$-$X_M$ associated with the features 302A-302M and used to indicate which of the features 302 are to be included in the reduced feature set. For example, according to some embodiments, the indexes of the reduced feature set information 114 respectively correspond to the various features 302A-302M and the values stored at these indexes are variables (e.g., weighting values, described above) for the corresponding features 302 indicating whether the respective features 302 are to be included in the reduced feature set.

In FIG. 3E, for example, the first entry in vector X (e.g., X[0]) is "0," indicating that corresponding feature 302A is not to be included in the reduced feature set, the second entry in vector X (e.g., X[1]) is "1," indicating that corresponding feature 302B is to be included in the reduced feature set, the third entry in vector X (e.g., X[2]) is "1," indicating that corresponding feature 302C is to be included in the reduced feature set, and the fourth entry in vector X (e.g., X[3]) is "0," indicating that corresponding feature 302B is not to be included in the reduced feature set. Note that the vectors for feature vectors 202, labels 204, and reduced feature set information 114 may be implemented using any of various suitable data structures (e.g., Arrays, ArrayLists, etc.), as desired.

Multivariate Effect Optimization Models

Figure 4:
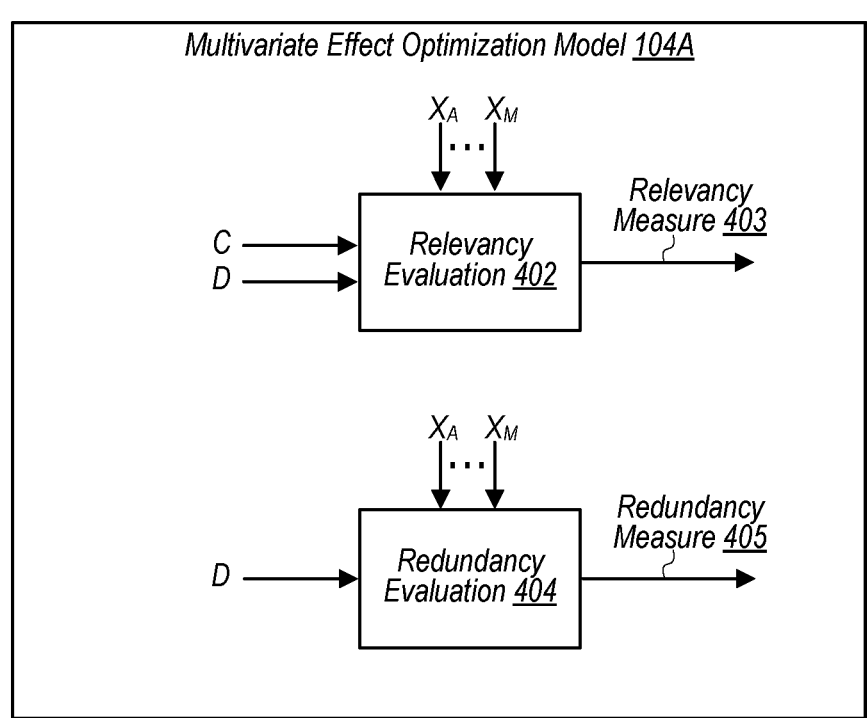
FIG. 4 is a block diagram illustrating an example representation of a multivariate effect optimization model, according to some embodiments.

Turning now to FIG. 4, block diagram 400 depicts an example representation of a multivariate effect optimization model 104A, according to some embodiments. In some embodiments, the multivariate effect optimization model 104A is a QUBO model. In various embodiments, the disclosed multivariate effect optimization model 104A may be used during a feature-selection process to select a reduced feature set (e.g., 500 features) from a larger set of features (e.g., 5,000 features), for example by processing a training dataset 110 based on the multivariate effect optimization model 104A.

As indicated in FIG. 4, in some embodiments the multivariate effect optimization model 104A aims to maximize the relevancy between groups of two or more features 302 and the set of labels 204 for the data samples 112. For example, in various embodiments the multivariate effect optimization model 104A performs a relevancy evaluation 402 to evaluate the relevancy between two or more of the features 302 and the set of labels 204 for the corresponding data samples 112. That is, in various embodiments, the relevancy evaluation 402 computes, for each of the features 302 and for groups of two or more features 302, the correlation between that particular feature 302 (or group of two or more features 302) and the label C. In the embodiment depicted in FIG. 4, the relevancy evaluation 402 is performed based on the set of binary variables $X_A$-$X_M$, the vector C, and the matrix D of feature vectors 202 for the training data samples 112 in the training dataset 110, though this is provided merely as one non-limiting example. As described in more detail below, in various embodiments the relevancy evaluation 402 is performed (in whole or in part) based on a Relevancy term of an objective function $f(x)$ utilized in the multivariate effect optimization model 104A.

Further, in the depicted embodiment, the multivariate effect optimization model 104A aims to minimize the redundancy between groups of three or more features 302. For example, in various embodiments the multivariate effect optimization model 104A performs a redundancy evaluation 404 to evaluate the redundancy between groups of three or more of the features 302. In the embodiment depicted in FIG. 4, the redundancy evaluation 404 is performed based on the set of binary variables $X_A$-$X_M$ and the matrix D of feature vectors 202 for the training data samples 112 in the training dataset 110, though this is provided merely as one non-limiting example. As described in more detail below, in various embodiments the redundancy evaluation 404 is performed (in whole or in part) based on a Redundancy term of the objective function $f(x)$ utilized in the multivariate effect optimization model 104A.

In some non-limiting embodiments, the objective function $f(x)$ for the multivariate effect optimization model 104A is provided as follows:

$$f(x) = -[\alpha \cdot \text{Relevancy} - (1-\alpha) \cdot \text{Redundancy}] \qquad (1)$$

where the Relevancy term provides a measure of the relevancy between groups of two or more features 302 and the set of labels 204, the Redundancy term provides a measure of redundancy between groups of three or more features 302, and $\alpha$ is a tunable weighting parameter that determines the relative weighting of the Relevancy and Redundancy terms. In various embodiments, both the Relevancy term and Redundancy term capture the interactive, multivariate effects of the features 302. For example, in some embodiments, the Relevancy term evaluates, and aims to maximize, the correlation between two (or more) features 302 (e.g., using the columns of matrix D corresponding to two or more features 302) and the set of labels 204 (e.g., vector C described above with reference to FIG. D). Further, in some embodiments, the Redundancy term evaluates, and aims to minimize, the correlation between three (or more) features 302 (e.g., using the columns in matrix D corresponding to three or more features 302). Note that, in various embodiments, $\alpha$ is a tunable parameter that is varied (thus solving different QUBOs), resulting in different reduced feature sets as outputs. In various embodiments, the disclosed techniques include selecting the reduced feature set as the one that produces a machine learning model, trained using the reduced feature set, which results in the highest accuracy score.

Various techniques may be used to evaluate the Relevancy and Redundancy terms and determine the relevancy measure 403 and redundancy measure 405, according to various embodiments. As non-limiting examples, in various embodiments, the multivariate effect optimization model 104A may use one or more of the following techniques to evaluate the Relevancy and Redundancy terms of the objective function $f(x)$ presented above: probability distribution and entropy assessment measures of relevance and redundancy; Jenson-Shannon divergence; the Kolmogorov-Smirnov test; multivariate correlation, which provides a measure of the predictive power of one feature 302 using a linear function of other set of features 302; multivariate analysis of variance ("MANOVA"), which compares one or more dependent features 302 across two or more groups; and tree based information gain techniques using the decision tree based division to compute the information gain across in one variable conditioned on other variables. Note, however, that these techniques are provided merely as non-limiting examples and, in other embodiments, other suitable techniques may be used to evaluate the relevancy and redundancy between the features 302 and the labels 204. Further note that, in some embodiments, multiple different measures of relevancy may be performed as part of the relevancy evaluation 402 to determine the relevancy measure 403. Similarly, in some embodiments, multiple different measures of redundancy may be used as part of the redundancy evaluation 404 to determine the redundancy measure 405. Additionally note that, in various embodiments, the same techniques may be used to evaluate the Relevancy and the Redundancy terms.

Note that, in various embodiments, the disclosed multivariate effect optimization model 104A may offer various technical improvements over a bi-variate correlation-based optimization model (e.g., a QUBO model) that utilizes an objective function that only evaluates the two-way effects of the input features. For example, bi-variate effect optimization models look solely at two-way interactions between features and then determine the extent to which those two features are redundant (if at all). If that redundancy measure is high, one of those features may be removed from the selected feature set. Bi-variate effect optimization models present various technical problems and limitations. For instance, after evaluating the correlation between two features, a bi-variate effect optimization model may then evaluate the extent of correlation between each of these two features with the response (e.g., the label). Consider, as an example, an instance in which a bi-variate effect model is used to determine that the correlation between Feature 1 and Feature 2 is sufficiently high such that it may be possible to remove one of these two features from the feature set. In this case, the bi-variate effect model may next need to determine which of Feature 1 and Feature 2 has a higher correlation with the response (e.g., the label). In performing this two-step process, information may be lost, particularly in regard to interactive effects (e.g., the interactive effects between the combination of Feature 1 and Feature 2).

In various embodiments, however, the disclosed techniques may overcome these technical problems using the disclosed QUBO formulations of the optimization models 104. For example, instead of just evaluating two-way effects of the input features 302 (e.g., the feature-feature and feature-output bi-variate correlations), in various embodiments the disclosed multivariate effects optimization model 104A also evaluates the multivariate effects that may be present in larger combinations of the features 302 such that these higher-order combinations of features may be identified and included in the reduced feature set. That is, because multiple features 302 may be highly correlated, the disclosed multivariate effects optimization model 104A may be used to efficiently capture these highly correlated combinations of features 302. This, in turn, may enable the disclosed multivariate effect optimization model 104A to constrain redundancy between features 302 in the selected reduced feature set while also taking into consideration the relevancy of larger combinations of features 302. Additionally, in various embodiments, the disclosed multivariate effect optimization model 104A may enable the identification and selection of larger combinations (e.g., three or more) of highly correlated features 302 in the reduced feature set, where these larger combinations of features 302 may go unidentified using a bi-variate correlation based QUBO model. Further, in various embodiments, the disclosed techniques allow for the application of a constraint based on the principle of sparsity of effects, providing a balance between identifying these higher-order combinations of features 302 and the computational complexity and efficiency of the optimization problem.

Note that, in some embodiments, the userbase of a service provided by a server system (e.g., an online payment service) may be considered "heterogeneous," consisting of many different types of users. For instance, there may be many different "populations" or "sub-groups" of users within the userbase that utilize the service in a similar manner. As a non-limiting example, there may be a first group of users that uses the service frequently (e.g., multiple times per day or week) such that there is a large amount of user data (e.g., login dates and times, IP addresses, device type, etc.) available for this first group of users. There may also be a second group of users that only use the service sporadically (e.g., once a month, several times per year, etc.) and about whom there is relatively little user data available. In many instances, because of the heterogeneity of the userbase, it may be difficult to identify a combination of features that can be used to train a machine learning model that performs well across these disparate sub-groups in the userbase. This technical problem is compounded in instances in which the users may access the service in multiple different ways, making the userbase even more diverse. For example, assume that users are able to interact with the service via a web interface (e.g., through a website associated with the web service), via third-party systems that send API requests to the service, and through a mobile application installed on a mobile computing device. In this case, the way in which a particular user utilizes the service may vary drastically depending on the manner in which the user accesses the service during a given session. In many instances, the combination of features that may be desirable to select for a feature set may vary depending on the access method. As a non-limiting example, a feature (e.g., wireless carrier, IP address changes, frequency of IP address changes, etc.) that may be useful for mobile access sessions may not be appropriate or desirable for sessions via the website. In various embodiments, however, the disclosed optimization models 104 (e.g., multivariate effect model 104A) are capable of identifying multi-variate interactions between different, higher-order combinations of features, resulting in feature sets that perform well across different populations in the highly heterogeneous userbase.

Additionally, in some embodiments, the context in which a machine learning model is to be deployed may significantly affect the optimal combination of features to include in a feature set used to train the machine learning model. Consider, as one non-limiting example, an instance in which a server system provides an online payment service and one or more machine learning models are utilized to detect fraudulent transactions. This context may present various technical challenges to the feature selection process. One such challenge is that of class imbalance, in which the majority (and, typically, the overwhelming majority) of transactions performed via the online payment service are not fraudulent. This class imbalance can result in a corresponding disparity in training samples included in the training dataset such that the majority of the training samples correspond to non-fraudulent transactions, which, in turn, can negatively impact the performance of the resulting model (e.g., an increase in false positives). Further, in this fraud-detection context, the complexity and changing nature of attempted fraudulent transactions may be such that considering solely two-way interactions between features (e.g., using bi-variate effects models) is insufficient to identify feature sets capable of training robust fraud detection models. In various embodiments, however, the disclosed optimization models 104 may be used to identify combinations of features for a feature set based on higher-order interactions between features such that the resulting feature set is usable to generate robust machine learning models that offer improved performance (e.g., lower false-positive rate) relative to other techniques.

Figure 5:
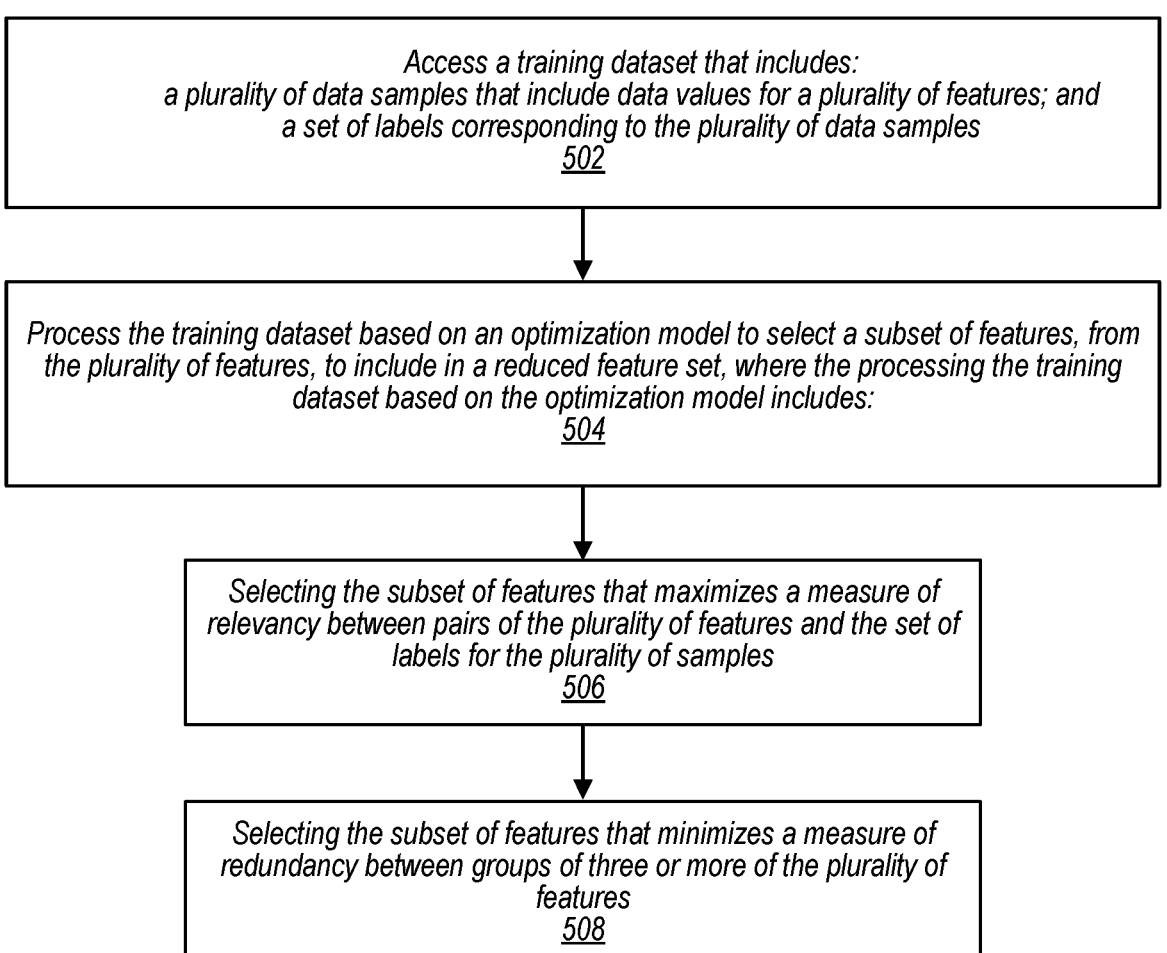
FIG. 5 is a flow diagram illustrating an example method for performing feature-selection based on a multivariate effect optimization model, according to some embodiments.

Referring now to FIG. 5, a flow diagram illustrating an example method 500 for performing feature-selection based on a multivariate effect optimization model is depicted, according to some embodiments. In various embodiments, method 500 may be used to select, from a set of features 302A-302M, a reduced feature set for a training dataset 110. In various embodiments, a training dataset (e.g., training dataset 110 or another training dataset) that includes data values for this reduced feature set may be used to train one or more machine learning models. In some non-limiting embodiments, some or all of method 500 may be performed by a computer system (e.g., a server system) that includes a quantum computing system (e.g., quantum computing system 106 of FIG. 1), where the computer system includes (or has access to) a non-transitory, computer-readable medium having program instructions stored thereon that are executable by the computer system to cause some or all of the operations described with reference to FIG. 5. In other non-limiting embodiments, some or all of method 500 may be performed by a computer system that has access to quantum computing system (e.g., quantum computing system 106), for example as part of a cloud-based quantum computing service. In FIG. 5, method 500 includes elements 502-508. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the computer system accesses a training dataset that includes a plurality of data samples that include data values for a plurality of features, and a set of labels corresponding to the plurality of data samples. For example, quantum computing system 106 may access the training dataset 110 that includes data samples 112A-112N. As discussed above with reference to FIG. 2, in various embodiments the data samples 112 have corresponding labels 204, which, in some embodiments, indicate a class into which the corresponding data samples 112 have been classified.

At 504, in the illustrated embodiment, the computer system processes the training dataset based on an optimization model (e.g., multivariate effect optimization model 104A) to select, from the plurality of features, a subset of features to include in a reduced feature set. For example, as described above, in various embodiments the quantum computing system 106 may map the feature-selection problem based on the optimization model 104 and the training dataset 110 to a target Hamiltonian utilizing one or more qubits of the quantum computing resources 109. In various embodiments the quantum computing system 106 may then use quantum annealing (e.g., via an adiabatic quantum computer) to determine the ground state spin information 113 that corresponds to a minimization of an objective function utilized in the optimization model 104, where the minimization of the objective function indicates the subset of features to include in the reduced feature set.

In the depicted embodiment, method element 504 includes sub-elements 506 and 508. Note, however, that this embodiment is provided merely as one non-limiting example. In other embodiments, method element 504 may include additional, fewer, or different sub-elements than shown, as desired. Note that, in various embodiments, method 500 includes performing a feature-selection operation based on a multivariate-effect optimization model 104A.

At sub-element 506 of the illustrated embodiment, for example, processing the training dataset based on the multivariate effect optimization model 104A includes selecting the subset of features that maximizes a measure of relevancy between pairs of the plurality of features 302 and the set of labels 204 for the plurality of samples 112 and, at 508 in the illustrated embodiment, selecting the subset of features that minimizes a measure of redundancy between groups of three or more of the plurality of features 302. Note that, in some embodiments, the objective function utilized by the optimization model 104A is usable to evaluate the relevancy between the set of labels 204 and groups of three or more of the plurality of features 302.

As noted above, various different techniques may be used to determine the measure of relevancy between the features (e.g., pairs of features or groups of three or more features) and the set of labels for the plurality of samples. As one non-limiting example, in some embodiments the multivariate effect optimization model 104A uses the Pearson correlation coefficient to determine the measure of relevancy between the pairs (or groups of three or more) features and the set of labels, though various other suitable techniques may also be used instead of or in addition to the Pearson correlation coefficient. Additionally note that, in various embodiments, the multivariate effect optimization model 104A uses a combination of multiple different measures of relevancy to evaluate the relevancy between the pairs of features (or groups of three or more features) and the set of labels. For example, in some embodiments, the multivariate effect optimization model 104A uses a combination of a first relevancy measure and a second relevancy measure to determine the measure of relevancy between the pairs of features and the set of labels for the plurality of samples.

Further, various different techniques may be used to determine the measure of redundancy between the features (e.g., groups of three or more feature). As one non-limiting example, in some embodiments the optimization model 104 uses the Spearman's rank correlation coefficient to evaluate the redundancy between groups of three or more of the plurality of features, though various other suitable techniques may also be used instead of or in addition to the Spearman's rank correlation coefficient. Additionally note that, in various embodiments, the optimization model 104 uses a combination of multiple different measures of redundancy to evaluate the redundancy between the groups of three or more features. For example, in some embodiments, the optimization model 104 uses a combination of a first redundancy measure and a second redundancy measure to determine the measure of redundancy between the groups of three or more features.

In various embodiments, method 500 includes using the reduced feature set to train one or more machine learning models. For example, in some embodiments, method 500 further includes generating an updated training dataset that includes data values for the subset of features that are included in the reduced feature set, where the updated training dataset does not include second data values for one or more of the plurality of features that are not included in the reduced feature set. In some such embodiments, method 500 includes then training a machine learning model based on the updated training dataset. In some embodiments, the training dataset 110 may correspond to electronic transactions performed, by a plurality of users, via an online payment service provided by a server system. In some such embodiments, the trained machine learning model may be a risk evaluation model that, once trained, is operable to evaluate a level of risk associated with a requested transaction.

Method 500 may include training any of various suitable types of machine learning models, as desired. In some embodiments, for example, a reduced feature set selected according to the disclosed techniques may be used to train an artificial neural network ("ANN") implemented using any suitable neural network architecture. For example, in some embodiments, an ANN may be implemented using a feed-forward neural network architecture, such as a multi-layer perceptron ("MLP") architecture or a convolutional neural network ("CNN") architecture. In other embodiments, however, an ANN may be implemented using a recurrent neural network ("RNN"), such as a long short-term memory ("LSTM") model. In further embodiments, an ANN may be implemented using an architecture that includes one or more layers of a feed-forward architecture and one or more layers of an RNN architecture. Note that these specific examples are provided merely as non-limiting embodiments, however, and that, in other embodiments, various suitable neural network architectures may be used, as desired. Further, note that multiple different machine learning algorithms may be used in building the various machine learning models. For example, in addition to (or instead of) using an ANN, method 500 may include training one or more of a decision tree model, a SGD classifier, a Naive Bayes model, a KNeighbors classifier model, a linear SVC model, or an ensemble model that utilizes one or more machine learning algorithms.

Further note that, in some embodiments, method 500 may include generating multiple different reduced feature sets. For example, in some embodiments, method 500 includes subsequently processing the training dataset (e.g., training dataset 110) based on a modified version of the optimization model 104 to select, from the plurality of features, a second subset of features to include in a second reduced feature set, where the second reduced feature set includes a different number of features than the reduced feature set. For example, in some embodiments, the α value included in an objective function utilized in the multivariate effect optimization model 104A may be varied such that a minimization of the objective function results in the selection of fewer features in the second reduced feature set. In some embodiments, method 500 further includes generating a second updated training dataset that includes data values for the second subset of features that are included in the second reduced feature set and training a second machine learning model based on the second updated training dataset. The computer system, in various embodiments, may then compare a performance of the first and second machine learning models and, based on this comparison, select either the reduced feature set or the second reduced feature set as a final feature set for the training dataset (e.g., training dataset 110).

Example Embodiments

The following numbered clauses present a set ("Set A") of various non-limiting embodiments disclosed herein:

A1. A method, comprising:

accessing, by a computer system, a training dataset that includes:

a plurality of data samples that include data values for a plurality of features; and a set of labels corresponding to the plurality of data samples; and processing, by the computer system, the training dataset based on an optimization model to select, from the plurality of features, a subset of features to include in a reduced feature set, wherein the processing the training dataset based on the optimization model includes:

selecting the subset of features that maximizes a measure of relevancy between pairs of the plurality of features and the set of labels for the plurality of data samples; and selecting the subset of features that minimizes a measure of redundancy between groups of three or more of the plurality of features.

A2. The method of clause A1, wherein the optimization model is a quadratic unconstrained binary optimization ("QUBO") model, and wherein the processing the training dataset includes:

using quantum annealing, determining ground state spin information that corresponds to a minimization of an objective function utilized in the QUBO model, wherein the minimization of the objective function corresponds to an output value that indicates the subset of features to include in the reduced feature set.

A3. The method of any of clauses A1-A2, further comprising:

generating, by the computer system, an updated training dataset that includes data values for the subset of features that are included in the reduced feature set, wherein the updated training dataset does not include second data values for one or more of the plurality of features that are not included in the reduced feature set; and training, by the computer system, a first machine learning model based on the updated training dataset.

A4. The method of clause A3, further comprising:

subsequently processing, by the computer system, the training dataset based on a modified version of the optimization model to select, from the plurality of features, a second subset of features to include in a second reduced feature set, wherein the second reduced feature set includes a different number of features than the reduced feature set.

A5. The method of clause A4, further comprising:

generating, by the computer system, a second updated training dataset that includes data values for the second subset of features that are included in the second reduced feature set;

training, by the computer system, a second machine learning model based on the second updated training dataset;

comparing, by the computer system, a performance of the first and second machine learning models; and based on the comparing, selecting, by the computer system, one of the reduced feature set and the second reduced feature set as a final feature set for the training dataset A6. The method of any of clauses A1-A5, wherein the optimization model uses the Pearson correlation coefficient to determine the measure of relevancy between the pairs of the plurality of features and the set of labels for the plurality of features.

A7. The method of any of clauses A1-A6, wherein the optimization model uses a combination of a first relevancy measure and a second relevancy measure to determine the measure of relevancy between the pairs of the plurality of features and the set of labels for the plurality of data samples.

A8. A method, comprising:

accessing, by a computer system, a training dataset that includes a plurality of data samples, wherein a given one of the plurality of data samples includes:

a label of an assigned classification for the given data sample; and data values for a plurality of features;

performing, by the computer system, a feature-selection operation to identify a reduced feature set from the plurality of features, wherein the feature-selection operation includes processing the training dataset based on an optimization model, and wherein, for the given data sample, the optimization model:

evaluates a relevancy between the label for the given data sample and pairs of the plurality of features;

evaluates a redundancy between groups of three or more of the plurality of features; and based on the feature-selection operation, generating, by the computer system, an output value that indicates a subset of the plurality of features to include in the reduced feature set.

A9. The method of clause A8, wherein the optimization model is a QUBO model, wherein the output value includes ground state spin information that corresponds to a minimization of an objective function utilized in the QUBO model, and wherein the processing the training dataset includes:

determining the ground state spin information using quantum annealing.

A10. The method of clause A9, wherein the objective function utilized in the QUBO model is usable to evaluate the relevancy between the label for the given data sample and groups of three or more of the plurality of features.

A11. The method of clause A9, further comprising: training, by the computer system, a first machine learning model based on the reduced feature set.

A12. The method of clause A11, further comprising:

subsequently performing, by the computer system, a second feature-selection operation to identify, from the plurality of features, a second subset of features to include in a second reduced feature set, wherein the second feature-selection operation includes processing the training dataset using a modified version of the QUBO model, wherein the second reduced feature set includes a different number of features than the reduced feature set.

training, by the computer system, a second machine learning model based on the second reduced feature set;

comparing, by the computer system, a performance of the first and second machine learning models; and based on the comparing, selecting, by the computer system, one of the reduced feature set and the second reduced feature set as a final feature set for the training dataset.

A13. The method of any of clauses A8-A12, wherein the optimization model uses the Spearman's rank correlation coefficient to evaluate the redundancy between the groups of three or more of the plurality of features.

A14. The method of any of clauses A8-A13, wherein the optimization model uses a combination of a first redundancy measure and a second redundancy measure to evaluate the redundancy between the groups of three or more features.

A15. A non-transitory, computer-readable medium having program instructions stored thereon that are executable by one or more computer systems to perform operations as recited in the method of any of clauses A1-A14.

A16. A system, comprising:

at least one processor coupled to the non-transitory, computer-readable medium of clause A15.

Multi-Term, Mutual Information-Based Optimization Models

In various embodiments, the disclosed techniques utilize a multi-term, mutual information ("MT-MI")-based optimization model 104B. As will be appreciated by one of skill in the art, "mutual information" ("MI") refers to a measure of mutual dependence between two or more variables. Further, "conditional mutual information" refers to a measure of conditional dependence between two or more variables given the observation of an additional variable. In various embodiments, the MT-MI optimization model 104B utilizes an objective function that evaluates both the mutual information and conditional information contribution from multiple different features 302 relative to the set of labels 204 for the various data samples 112 in the training dataset 110. In various embodiments, the MT-MI optimization model 104B helps discover higher-order interactions between different combinations of features 302 that would have been difficult or impossible to discover using prior techniques. By identifying and including these highly correlated features 302 in the reduced feature set, various embodiments of the disclosed techniques may improve the predictive value of machine learning models built on those reduced feature sets.

Figure 6:
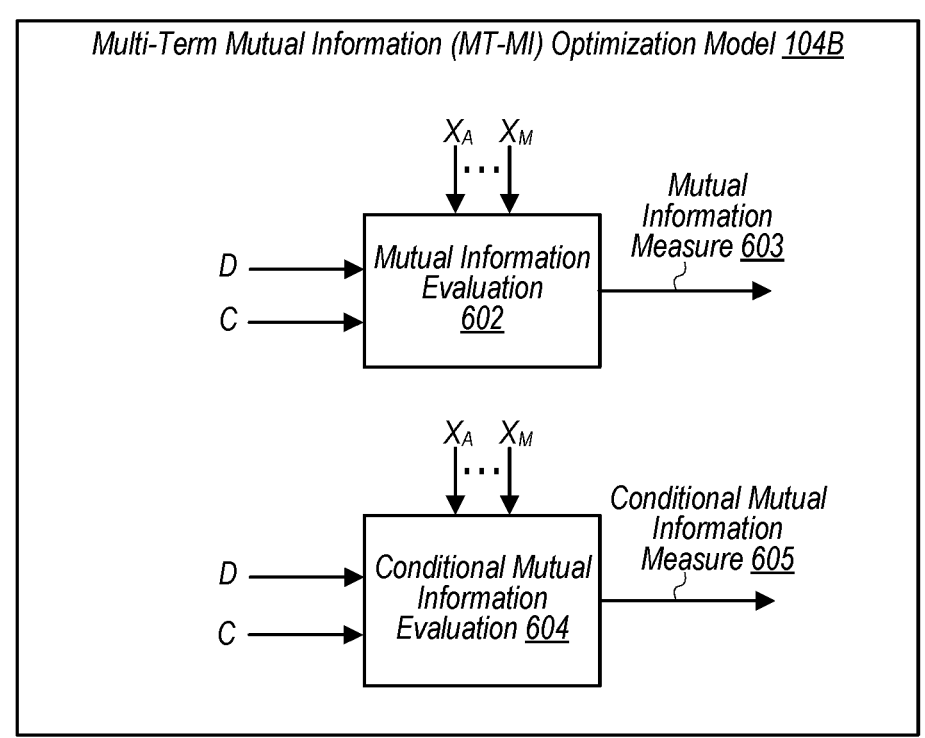
FIG. 6 is a block diagram illustrating an example representation of a multi-term mutual information optimization model, according to some embodiments.

Referring now to FIG. 6, block diagram 600 depicts an example representation of a MT-MI optimization model 104B, according to some embodiments. In various embodiments, the MT-MI optimization model 104B may be a QUBO model. In some embodiments the MT-MI optimization model 104B evaluates a measure of mutual information between groups of two or more features 302 and the set of labels 204 for the data samples 112. Further, in the depicted embodiment, the MT-MI optimization model 104B evaluates a measure of conditional mutual information between a first feature 302 (e.g., feature 302A) and the set of labels 204 provided that a group of two or more other features 302 (e.g., features 302B and 302C) are selected for inclusion in the reduced feature set. In various embodiments, the disclosed MT-MI optimization model 104B may be used during a feature-selection process to select a reduced feature set (e.g., 1,000 features) from a larger set of features (e.g., 10,000 features), for example by processing a training dataset 110 based on the MT-MI optimization model 104B.

In some non-limiting embodiments, the objection function $f(x)$ for the MT-MI optimization model 104B is provided as follows:

$$f(x) = \max_{S \in X}\left[\sum\nolimits_{X_i \in S} I(X_i; C) + \sum\nolimits_{X_i X_j \in S} I(X_i, X_j; C) + \dots \right] + \tag{2}$$

$$\left[\sum\nolimits_{X_i, X_j \in S} I(X_i; C \mid X_j) + \right.$$

$$\sum\nolimits_{X_i, X_j, X_k}\left(I(X_i; C \mid X_j, X_k) + I(X_i, X_j; C \mid X_k)\right) + \dots \left. \right], \text{ s.t.} |S| = k$$

where Xi, Xj, and Xk are binary variables corresponding to the features 302I, 302J, and 302K (respectively), C is a vector corresponding to the set of labels 204 for the data samples 112 in the training dataset 110, S denotes the set of selected features, and k is a parameter that dictates the size of the set S of selected features.

As indicated above, in various embodiments the objective function in Equation 2 is a global maximization problem, the solution to which will include those features 302 that maximize the value of the two terms in the objective function. Note, however, that in various embodiments the size of the set of selected features is limited by the parameter k. Accordingly, in various embodiments the reduced feature set information 114 generated using the MT-MI optimization model 104B will be provided as a vector X of binary values $X_A$-$X_M$ indicating which of the features 302A-302M to include in the reduced feature set.

The objective function in Equation 2 may be said to include two terms: a first term used to evaluate the measure of mutual information between features 302 and the set of labels 204, and a second term used to evaluate a measure of conditional mutual information between one or more features 302 and the set of labels 204 provided that one or more additional features 302 are selected. Each of these two terms in the objective function of Equation 2 is discussed in more detail below, according to some non-limiting embodiments. Specifically, Equation 2.1 (below) includes the first term of the objective function in Equation 2 and Equation 2.2 (below) includes the second term of the objective function in Equation 2.

In Equation 2, the first term of the objective function, also referred to herein as the "mutual information term," is provided as follows:

$$\sum_{X_i \in S} I(X_i; C) + \sum_{X_i X_j \in S} I(X_i, X_j; C) + \dots \tag{2.1}$$

In various embodiments, the mutual information term provides an evaluation of a measure of the correlation between the features 302 and the set of labels 204. For example, if a feature 302 (or group of two or more features 302) and the set of labels 204 are highly correlated, then, in various embodiments, the measure of the mutual information term will be high, indicating this high level of correlation.

In the depicted embodiment, the mutual information term first evaluates the extent to which a feature 302 corresponding to variable Xi is correlated to the labels C (e.g., the set of labels 204) for the data samples 112. More specifically, the mutual information term first includes a summation of the mutual information provided by a feature corresponding to variable Xi given C for all features that are included in the set S of selected features.

Next, the mutual information term evaluates the mutual information between two features 302 and the set of labels 204. That is, in the depicted embodiment, the mutual information term next determines the extent to which the combination of two features 302 (corresponding to variables Xi and Xj) are correlated with the labels C. More specifically, the mutual information term next includes a summation of the mutual information provided by the combination of features 302 (corresponding to variables Xi and Xj) given C for all combinations of Xi and Xj that are included in the set S of selected features.

Note that, as indicated in Equations 2 and 2.1, the mutual information term may be expanded to evaluate additional components of mutual information between larger groups of features 302 and the set of labels 204. For example, in some embodiments, the mutual information term may further evaluate the mutual information between groups of three features 302 and the set of labels 204, between groups of four features 302 and the set of labels, etc. As one non-limiting example, in some embodiments the mutual information term may next include a summation of the mutual information provided by the combination of features Xi, Xj, and Xk given C for all combinations of Xi, Xj, and Xk that are included in the set S of selected features.

In Equation 2, the second term of the objective function, also referred to herein as the "conditional mutual information term," is provided as follows:

$$\sum_{X_i, X_j \in S} I(X_i; C \mid X_j) + \tag{2.2}$$

$$\sum_{X_i, X_j, X_k}\left(I(X_i; C \mid X_j, X_k) + I(X_i, X_j; C \mid X_k)\right) + \dots$$

In various embodiments, the conditional mutual information term shown in Equation 2.2 provides an evaluation of a measure of the correlation between one or more features 302 and the set of labels 204 provided that one or more additional features 302 are also selected for the reduced feature set. For example, in some instances the extent of mutual dependence between a feature 302 (or group of two or more features 302) and the set of labels 204 may depend on the presence of one or more additional features 302. In various embodiments, if a feature 302 (or group of two or more features 302) and the set of labels 204 are highly correlated when the presence of one or more additional features 302 is also observed, then, in various embodiments, the measure of the conditional mutual information term will be high, indicating this high level of correlation.

In the depicted embodiment, the conditional mutual information term in Equation 2.2 first evaluates the extent to which a feature 302 corresponding to variable Xi is correlated to the labels C (e.g., the set of labels 204) for the data samples 112 conditioned on the presence of an additional feature 302 corresponding to variable Xj. More specifically, the conditional mutual information term first includes a summation of the mutual dependence between a feature 302 corresponding to variable Xi and the labels C conditioned on the presence of another feature 302 corresponding to variable Xj.

Next, in the depicted embodiment, the conditional mutual information term includes a multi-term conditional mutual information component. That is, rather than only evaluating the mutual information between one feature 302I and the set of labels 204 conditioned on one other feature 302J, the disclosed MT-MI-based optimization model 104B evaluates the multivariate effects between groups of features 302 and the set of labels 204. More specifically, the conditional mutual information term includes a component that evaluates the mutual information between a feature 302 corresponding to variable Xi and the labels C conditioned on the presence of a combination multiple other features 302 corresponding to variables Xj and Xk. Further, the conditional mutual information term also includes a component that evaluates the mutual information between a combination of features 302 corresponding to variables Xi and Xj and the labels C conditioned on the presence of an additional feature 302 corresponding to variable Xk.

As indicated in Equation 2.2, the conditional mutual information term can also be expanded to evaluate additional components of conditional mutual information between larger groups of features 302 and the set of labels 204 conditioned on the presence of, optionally, even larger groups of other features 302, as desired. For example, in some non-limiting embodiments the conditional mutual information term further evaluates the mutual information between a feature 302 that corresponds to variable Xi and the labels C conditioned on the presence of a combination of three other features 302 (that, respectively, correspond to variables Xj, Xk, and Xl). Further, in some embodiments, the conditional mutual information term evaluates the mutual information between a group of two features 302 (that correspond to variables Xi and Xj) and the labels C conditioned on the presence of two (or more) other features 302 (corresponding to variables Xk and Xl), or the mutual information between a group of three features 302 (corresponding to Xi, Xj, and Xk) and the labels C conditioned on the presence of one feature 302 (that corresponds to variable Xl) or a combination of two or more features 302 (that correspond to variables Xl-Xm).

Note that, in various embodiments, the disclose MT-MI optimization model 104B provides various technical benefits over a mutual information optimization model (e.g., a QUBO model) that utilizes an objective function that includes a mutual information term that evaluates the mutual information of a single feature given the set of labels and a conditional mutual information term that evaluates only the conditional mutual information between one feature and the set of labels conditioned on the presence of one additional feature. For example, such an objective function would be restrictive in instances in which the features in the dataset are highly multi-correlated, failing to fully evaluate the multivariate effects between these highly correlated features. Using the disclosed MT-MI optimization model 104B, however, enables the disclosed techniques to evaluate the mutual information and conditional mutual information between larger sets of features 302 and take these multivariate effects into consideration when selecting the features 302 to include in the reduced feature set. This, in turn, may lead to the identification of larger combinations of features 302 to include in a reduced feature set that would not have been discovered using prior techniques.

Referring now to FIG. 7, a flow diagram illustrating an example method 700 for performing feature-selection based on a MT-MI optimization model is depicted, according to some embodiments. In various embodiments, method 700 may be used to select, from a set of features 302A-302M, a reduced feature set for a training dataset 110. In various embodiments, a training dataset (e.g., training dataset 110 or another training dataset) that includes data values for this reduced feature set may be used to train one or more machine learning models. In some non-limiting embodiments, some or all of method 700 may be performed by a computer system (e.g., a server system) that includes a quantum computing system (e.g., quantum computing system 106 of FIG. 1), where the computer system includes (or has access to) a non-transitory, computer-readable medium having program instructions stored thereon that are executable by the computer system to cause some or all of the operations described with reference to FIG. 7. In other non-limiting embodiments, some or all of method 700 may be performed by a computer system that has access to quantum computing system (e.g., quantum computing system 106), for example as part of a cloud-based quantum computing service. In FIG. 7, method 700 includes elements 702-708. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the computer system accesses a training dataset that includes a plurality of data samples that include data values for a plurality of features, and a set of labels corresponding to the plurality of data samples. For example, quantum computing system 106 may access the training dataset 110 that includes data samples 112A-112N. As discussed above with reference to FIG. 2, in various embodiments the data samples 112 have corresponding labels 204, which, in some embodiments, indicate a class into which the corresponding data samples 112 have been classified.

At 704, in the illustrated embodiment, the computer system performs a feature-selection operation to identify a reduced feature set from the plurality of features, where the feature-selection operation includes processing the training dataset based on an optimization model 104 (e.g., the MT-MI optimization model 104B). For example, as described above, in various embodiments the quantum computing system 106 may map the feature-selection problem based on the MT-MI Optimization model 104B and the training dataset 110 to a target Hamiltonian utilizing one or more qubits of the quantum computing resources 109. In various embodiments the quantum computing system 106 may then use quantum annealing to determine the ground state spin information 113 that, in some embodiments, corresponds to a maximization of an objective function utilized in the MT-MI optimization model 104B, where the maximization of the objective function indicates the subset of features to include in the reduced feature set.

In the depicted embodiment, method element 704 includes sub-elements 706 and 708. Note, however, that this embodiment is provided merely as one non-limiting example. In other embodiments, method element 704 may include additional, fewer, or different sub-elements than shown, as desired.

At sub-element 706 of the illustrated embodiment, processing the training dataset based on the optimization model includes evaluating a measure of mutual information between groups of two or more features and the set of labels for the plurality of data samples. For example, as described above with reference to FIG. 6, MT-MI optimization model 104B, in various embodiments, utilizes an object function (e.g., the objective function specified above in Equation 2) that determines a mutual information measure 603 to evaluate the measure of mutual information between a single feature (corresponding to variable Xi) and the labels C and evaluates a measure of mutual information between a combination of two features (that correspond to variables Xi and Xj) and the labels C. Note that, as described above, in various embodiments the mutual information term of the objective function utilized by the MT-MI optimization model 104B may be expanded so as to evaluate the mutual information between larger groups of features 302 and the set of labels 204.

At sub-element 708 of the illustrated embodiment, processing the training dataset based on the optimization model includes evaluating a measure of conditional mutual information between a first feature and the set of labels for the plurality of features provided that a group of two or more other features are selected for inclusion in the reduced feature set. For example, as described above with reference to FIG. 6, in various embodiments the MT-MI optimization model 104B utilizes an objective function that determines a conditional mutual information measure between one or more features 302 (e.g., a feature 302 that corresponds variable Xi) and the labels 204 provided that a combination of two or more additional features 302 (corresponding to variables Xj and Xk) are also selected for the reduced feature set. Note that, in some embodiments the conditional mutual information term of the objective function utilized by the MT-MI optimization model 104B may be expanded so as to evaluate the conditional mutual information between larger groups of features 302 and the set of labels 204 conditioned on the presence of one or more additional features 302. For example, in some embodiments the conditional mutual information term further evaluates a measure of conditional mutual information between a first plurality of features 302 (corresponding to variables X and X) and the set of labels 204 conditioned on the presence of an additional feature 302 (that corresponds to variable Xk).

Example Embodiments

The following numbered clauses present a set ("Set B") of various non-limiting embodiments disclosed herein:

B1. A method, comprising:
  accessing, by a computer system, a training dataset that includes:
    a plurality of data samples that include data values for a plurality of features; and
    a set of labels corresponding to the plurality of data samples; and
  performing, by the computer system, a feature-selection operation to identify a reduced feature set from the plurality of features, wherein the feature-selection operation includes processing the training dataset using a optimization model that:
    evaluates a measure of mutual information between groups of two or more features and the set of labels for the plurality of data samples; and
    evaluates a measure of conditional mutual information between a first feature and the set of labels for the plurality of features provided that a group of two or more other features are selected for inclusion in the reduced feature set.

B2. The method of clause B2, wherein the optimization model further evaluates a second measure of conditional mutual information between a first plurality of features and the set of labels for the plurality of data samples provided that one or more additional features are also selected for inclusion in the reduced feature set.

B3. The method of either of clauses B1 or B2, wherein the optimization model is a QUBO model, and wherein the processing the training dataset includes:

using quantum annealing, determining ground state spin information that corresponds to a minimization of an objective function utilized in the QUBO model, wherein the minimization of the objective function corresponds to an output value that indicates a subset of features to include in the reduced feature set.

B4. The method of clause B3, wherein the QUBO model is an ensemble QUBO model that further:
  evaluates a measure of relevancy between pairs of the plurality of features and the set of labels for the plurality of data samples; and
  evaluates a measure of redundancy between groups of three or more of the plurality of features.

B5. The method of clause B4, wherein the objective function utilized in the ensemble QUBO model includes a first hyper-parameter usable to weight first and second portions of the ensemble QUBO model.

B6. The method of clause B5, further comprising:
  generating, by the computer system, an updated training dataset that includes data values for the subset of features that are included in the reduced feature set, wherein the updated training dataset does not include second data values for one or more of the plurality of features that are not included in the reduced feature set; and
  training, by the computer system, a first machine learning model based on the updated training dataset.

B7. A non-transitory, computer-readable medium having program instructions stored thereon that are executable by one or more computer systems to perform operations as recited in the method of any of clauses B1-B6.

B8. A system, comprising:
  at least one processor coupled to the non-transitory, computer-readable medium of clause B7.

Ensemble Optimization Models

In various embodiments, the disclosed techniques further include using a hybrid optimization model 104C that combines two or more different optimization models into an ensemble. In various embodiments, a hybrid optimization model 104C that utilizes elements of two or more other optimization models may provide various technical benefits. For example, when taken individually, a single optimization model may include a particular goal (or, possibly, multiple goals) that drive the optimization process when using that model. That is, in various embodiments, different optimization models use different objective functions and, by extension, have different optimization goals. By combining multiple models into an ensemble model (e.g., hybrid optimization model 104C), the disclosed techniques are operable to optimize the combined objective function, taking into consideration the optimization goal(s) from the multiple models. Note that, in various embodiments, the hybrid optimization model 104C may be a QUBO model.

Figure 8:
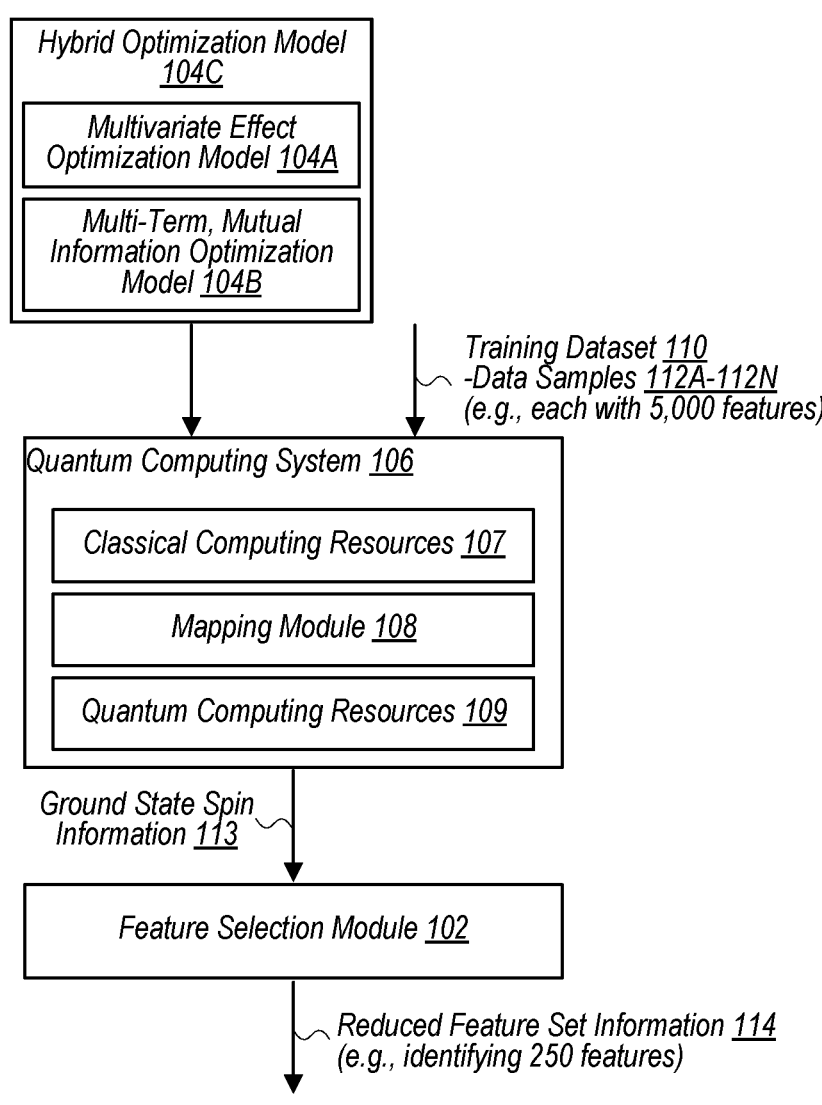
FIG. 8 is a block diagram illustrating an example representation of a hybrid optimization model, according to some embodiments.

Referring now to FIG. 8, block diagram 800 depicts a system in which a hybrid optimization model 104C is utilized in a feature-selection process to select a reduced feature set for use in training one or more machine learning models, according to some embodiments. In the non-limiting embodiment depicted in FIG. 8, hybrid optimization model 104C is an ensemble of both the multivariate effect optimization model 104A and MT-MI optimization model 104B, described above. In various embodiments, the hybrid optimization model 104C depicted in FIG. 8 retains, from multivariate effect optimization model 104A, the ability to evaluate the relevancy between features 302 and the set of labels 204 and the redundancy between groups of features 302, while also taking into consideration mutual information and conditional mutual information contributions from combinations of multiple features 302, as provided by the MT-MI optimization model 104B. Accordingly, in various embodiments, the disclosed hybrid optimization model 104C allows the disclosed techniques to utilize benefits from both of these models 104A-104B.

In some non-limiting embodiments, the objective function for the hybrid optimization model 104C is provided as follows:

$$f(x)=\beta\cdot[\text{Multivariate effect Model } 104A]+(1-\beta)\cdot \\ [\text{MT-MI Model } 104B] \qquad (3)$$

In Equation 3, the objective function for the hybrid optimization model 104C includes a first term, also referred to herein as the "multivariate effects" term, which incorporates aspects of the objective function for the multivariate effect optimization model 104A, described above. Further, in Equation 3, the objective function for the hybrid model 104C includes a second term, also referred to herein as the "MT-MI" term, which incorporates aspects of the objective function for the MT-MI optimization model 104B, described above.

Note that the objective function in Equation 3 further includes β, which is a tunable weighting parameter that determines the relative weighting of the multivariate effect optimization model 104A term and the MT-MI optimization model 104B term within the hybrid optimization model 104C. Stated differently, in Equation 3, the objective function for the hybrid optimization model 104C is a weighted multi-objective function that provides the solution that optimizes for the combined objective functions. In doing so, the search space for the values for the binary variables $X_A$-$X_M$ is catered to finding the solution that best fits goals from both models 104A and 104B. The β value, in various embodiments, enables the different portions of the combined objective function to be weighted, scaling the extent of the contribution from these different models during the optimization process.

Note that the embodiment depicted in FIG. 8 is provided merely as one non-limiting embodiment and, in other embodiments, hybrid optimization model 104C may be an ensemble of any suitable combination of optimization models 104A, 104B, 104D, and 104E disclosed herein (or, in some embodiments, one or more other optimization models). For example, in some embodiments, hybrid optimization model 104C utilizes aspects of multivariate effect optimization model 104A and the feedback-assisted optimization model 104D described below, or the MT-MI optimization model 104B and the feature-ranking-based optimization model 104E described below, or all of the multivariate effect optimization model 104A, the MT-MI optimization model 104B, the feedback-assisted optimization model 104D, and the feature-ranking-based optimization model 104E.

Turning now to FIG. 9, a flow diagram illustrating an example method 900 for performing feature-selection based on a hybrid optimization model is depicted, according to some embodiments. In various embodiments, method 900 may be used to select, from a set of features 302A-302M, a reduced feature set for a training dataset 110. In various embodiments, a training dataset (e.g., training dataset 110 or another training dataset) that includes data values for this reduced feature set may be used to train one or more machine learning models. In some non-limiting embodiments, some or all of method 900 may be performed by a computer system (e.g., a server system) that includes a quantum computing system (e.g., quantum computing system 106 of FIG. 1), where the computer system includes (or has access to) a non-transitory, computer-readable medium having program instructions stored thereon that are executable by the computer system to cause some or all of the operations described with reference to FIG. 9. In other non-limiting embodiments, some or all of method 900 may be performed by a computer system that has access to quantum computing system (e.g., quantum computing system 106), for example as part of a cloud-based quantum computing service. In FIG. 9, method 900 includes elements 902-912. While these elements are shown in a particular order for ease of understanding, other orders may be used. In various embodiments, some of the method elements may be performed concurrently, in a different order than shown, or may be omitted. Additional method elements may also be performed as desired.

At 902, in the illustrated embodiment, the computer system accesses a training dataset that includes a plurality of data samples that include data values for a plurality of features, and a set of labels corresponding to the plurality of data samples. For example, quantum computing system 106 may access the training dataset 110 that includes data samples 112A-112N. As discussed above with reference to FIG. 2, in various embodiments the data samples 112 have corresponding labels 204, which, in some embodiments, indicate a class into which the corresponding data samples 112 have been classified.

At 904, in the illustrated embodiment, the computer system performs a feature-selection operation to identify a reduced feature set from the plurality of features, where the feature-selection operation includes processing the training dataset based on an ensemble optimization model. For example, as described above with reference to FIG. 8, in various embodiments method 900 includes using the hybrid optimization model 104C to generate the reduced feature set information 114 indicative of a reduced feature set to select based on the training dataset 110. In the depicted embodiment, the ensemble optimization model of element 904 is an ensemble of the disclosed multivariate effect optimization model 104A and the MT-MI optimization model 104B and performs the operations set out in elements 906-912. Note, however, that this embodiment is provided merely as one non-limiting example and, in other embodiments, additional, fewer, or different operations may be performed.

In the non-limiting embodiment of FIG. 9, elements 906 and 908 may correspond to contributions to the ensemble optimization model from an MT-MI component of the objective function for the ensemble optimization model (e.g., Equation 3, above). At 906, in the illustrated embodiment, the ensemble optimization model evaluates a measure of mutual information between groups of two or more features and the set of labels for the plurality of data samples. For example, as described above, the mutual information term of the MT-MI optimization model 104B may evaluate the extent to which a feature 302 is correlated with the set of labels 204 and, additionally, evaluate the mutual information between two features 302 and the set of labels 204.

At 908, in the illustrated embodiment, the ensemble optimization model evaluates a measure of conditional mutual information between a first feature and the set of labels for the plurality of data samples provided that a group of two or more other features are selected for inclusion in the reduced feature set. For example, as described above, the conditional mutual information term of the MT-MI optimization model 104B may evaluate the correlation between one or more features 302 and the set of labels 204 provided that one or more additional features 302 are also selected for inclusion in the reduced feature set.

In the non-limiting embodiment of FIG. 9, elements 910 and 912 may correspond to contributions to the ensemble optimization model from a multivariate effect component of the objective function for the ensemble optimization model (e.g., Equation 3, above). At 910, in the illustrated embodiment, the ensemble optimization model evaluates the relevancy between pairs of the plurality of features and the set of labels for the plurality of data samples. For example, as described above, the Relevancy term of the multivariate effect optimization model 104A may provide a measure of the relevancy between groups of two or more features 302 and the set of labels 204. At 912, in the illustrated embodiment, the ensemble optimization model evaluates the redundancy between groups of three or more of the plurality of features. For example, as described above, the Redundancy term of the multivariate effect optimization model 104A may provide a measure of redundancy between groups of three or more features 302. Note that, in some embodiments, the Relevancy and Redundancy terms may be weighted using a tunable weighting parameter a that determines the relative weighting of the two terms. In various embodiments, α is a hyper-parameter that may be adjusted to modify the extent of the contribution from these two terms in the objective function for the ensemble optimization model.

Example Embodiments

The following numbered clauses present a set ("Set C") of various non-limiting embodiments disclosed herein:

C1. A method, comprising:

accessing, by a computer system, a training dataset that includes:

a plurality of data samples that include data values for a plurality of features; and a set of labels corresponding to the plurality of data samples; and performing, by the computer system, a feature-selection operation to identify a reduced feature set from the plurality of features, wherein the feature-selection operation includes processing the training dataset using a optimization model that:

evaluates a measure of mutual information between groups of two or more features and the set of labels for the plurality of data samples; and evaluates a measure of conditional mutual information between a first feature and the set of labels for the plurality of features provided that a group of two or more other features are selected for inclusion in the reduced feature set.

C2. The method of clause C1, wherein the optimization model is a QUBO model, and wherein the processing the training dataset includes:

using quantum annealing, determining ground state spin information that corresponds to a minimization of an objective function utilized in the QUBO model, wherein the minimization of the objective function corresponds to an output value that indicates a subset of features to include in the reduced feature set.

C3. The method of clause C2, wherein the QUBO model is an ensemble QUBO model that further:

evaluates a measure of relevancy between pairs of the plurality of features and the set of labels for the plurality of data samples; and evaluates a measure of redundancy between groups of three or more of the plurality of features.

C4. The method of clause C3, wherein the objective function utilized in the ensemble QUBO model includes a first hyper-parameter usable to weight first and second portions of the ensemble QUBO model.

C5. The method of clause C4, further comprising:

generating, by the computer system, an updated training dataset that includes data values for the subset of features that are included in the reduced feature set, wherein the updated training dataset does not include second data values for one or more of the plurality of features that are not included in the reduced feature set; and training, by the computer system, a first machine learning model based on the updated training dataset.

C6. A non-transitory, computer-readable medium having program instructions stored thereon that are executable by one or more computer systems to perform operations as recited in the method of any of clauses C1-C5.

C7. A system, comprising:

at least one processor coupled to the non-transitory, computer-readable medium of clause C6.

Feedback-Assisted Optimization Models

In the feature-selection process, candidate features are often tested by training a machine learning model based on those candidate features and then testing that machine learning model across multiple splits of a test dataset. In many instances, it is desirable for the performance of the test model to remain consistent across different test set splits. That is, in many cases it is desirable for the variance in performance of the test model (trained based on the candidate features) to be low across the different test set splits to ensure that the model is not skewed towards one particular test split. Existing optimization model-based feature-selection techniques fail to incorporate model performance information into the optimization model, thereby failing to take performance variance into consideration.

In various embodiments, however, one or more of the disclosed optimization models 104 may utilize feedback from a predictive model (e.g., a machine learning classifier model) to boost the performance of the optimization models 104 in the feature-selection process. For example, as described with reference to FIGS. 10-11 below, various disclosed embodiments include using a feedback-assisted optimization model 104D that utilizes feedback from a predictive model trained based on a candidate feature set selected during a previous iteration of the feature-selection process. By utilizing this feedback information, various embodiments of the feedback-assisted optimization model 104D consider the performance variance of the predictive models trained on the candidate feature set and modifying the manner in which the reduced feature set is selected during a subsequent iteration of the feature-selection process. This, in turn, may enable the disclosed feedback-assisted feature-selection techniques to select reduced feature sets that result in machine learning models, trained based on the reduced feature set, that have low performance variance between test splits, thereby improving the performance of these machine learning models.

Figure 10:
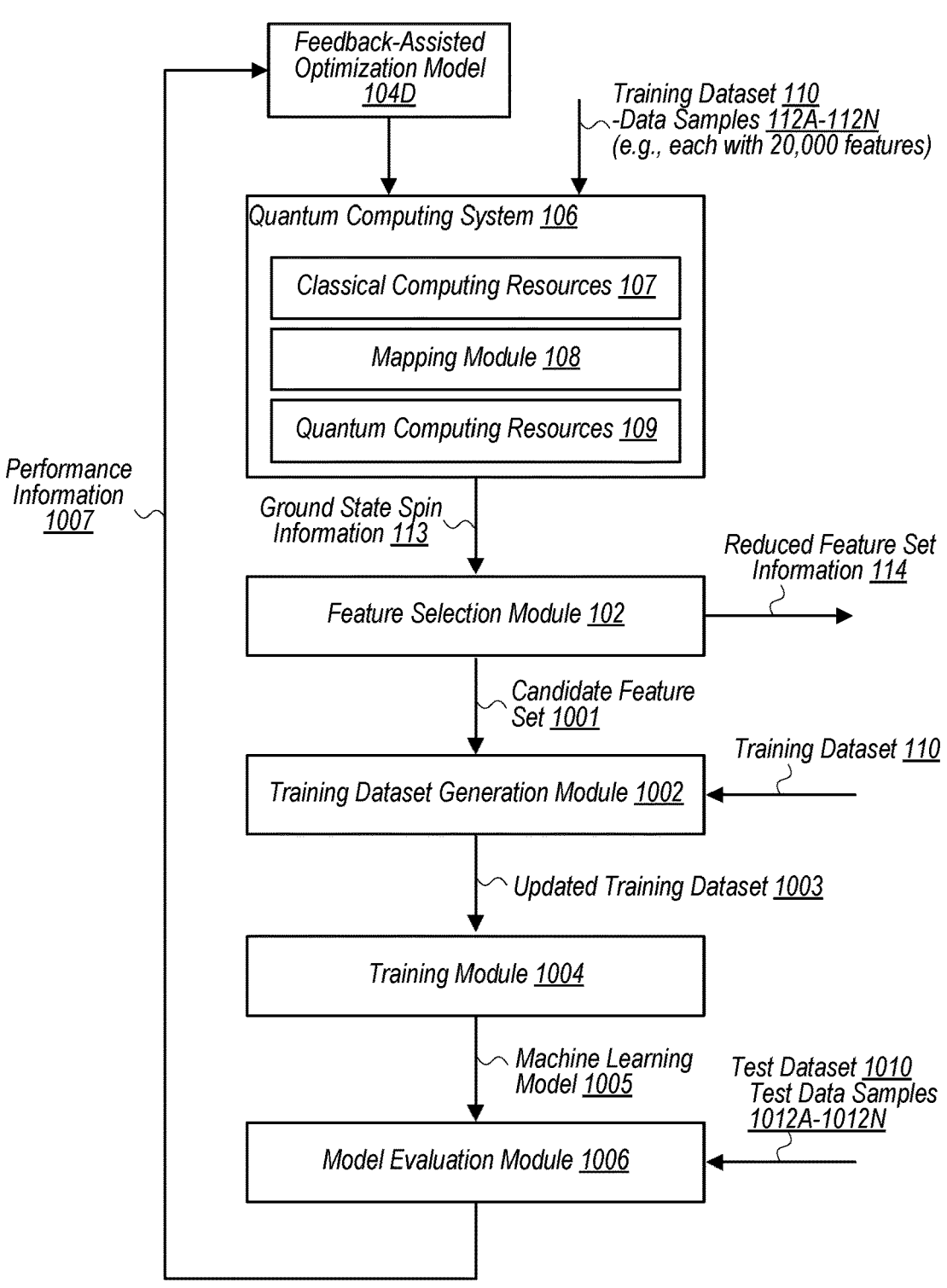
FIG. 10 is a block diagram illustrating an example representation of a feedback-assisted optimization model, according to some embodiments.

Referring now to FIG. 10, block diagram 1000 depicts a system in which a feedback-assisted optimization model 104D is utilized in a feature-selection process to select a reduced feature set for use in training one or more machine learning models, according to some embodiments. Note that, in various embodiments, the disclosed feedback-assisted feature-selection techniques are an iterative process in which a candidate feature set is selected, the performance of a machine learning model trained based on the candidate feature set is tested, and performance feedback information is utilized in selecting a new candidate feature set. Through this iterative process, various disclosed embodiments are operable to select a reduced feature set that is optimized to reduce a variance in performance across multiple different test splits.

In some non-limiting embodiments, the objective function for the feedback-assisted optimization model 104D is provided as follows:

$$f(x)=[\text{Relevancy}]-[\text{Redundancy}]-[\text{Variance on test splits}] \quad (4)$$

In this non-limiting example, the objective function in Equation 4 includes three terms: a Relevancy term usable to evaluate the relevancy between various combinations of features 302 relative to the set of labels 204, a Redundancy term usable to evaluate the redundancy between various combinations of features 302, and a Variance term usable to incorporate feedback based on a measure of performance variance between different test splits. In various embodiments, this Variance term in the objective function is a model stability metric that takes guidance from the classifier score obtained on the test splits.

Note that various techniques may be used to evaluate the Relevancy, Redundancy, and Variance terms in the objective function $f(x)$ in Equation 4, according to various embodiments. Non-limiting techniques that may be used to evaluate the Relevancy and Redundancy terms are described above with reference to FIG. 4 and the objective function in Equation 1 used in the multivariate effect optimization model 104A. Further note that the objective function provided above in Equation 4 is merely one non-limiting example and, in other embodiments, the feedback-assisted feature-selection techniques may be used with any of the other optimization models 104A-104C and 104E described herein. That is, in various embodiments, the disclosed techniques may utilize feedback from a predictive model used to evaluate the performance of an optimization model 104 in selecting a reduced feature set and, based on this performance feedback information, may modify the manner in which the optimization model 104 selects the reduced feature set during a subsequent iteration of the process.

In the depicted embodiment, the quantum computing system 106 is provided with a feedback-assisted optimization model 104D and a training dataset 110 that includes data samples 112A-112N. In various embodiments the quantum computing system 106 generates ground state spin information 113 based on the feedback-assisted optimization model 104D, as described in greater detail above. For example, in various embodiments a feature-selection problem modeled using the feedback-assisted optimization model 104D is mapped to a target Hamiltonian representation using the quantum computing resources 109 of the quantum computing system 106. The quantum computing system 106 may then use quantum annealing to determine the ground state spin information 113 that corresponds to a solution to this feature-selection problem.

In FIG. 10, the feature-selection module 102 determines a candidate feature set 1001 based on this ground state spin information 113. In various embodiments, the candidate feature set 1001 is an initial (or intermediate) selection of features 302 based on an initial (or previous) iteration of the feedback-assisted feature-selection process. In various embodiments, the candidate feature set 1001 is used in the training of one or more machine learning models 1005 such that the performance information 1007 corresponding to the performance of the machine learning model(s) 1005 may be utilized in subsequent iterations of the feedback-assisted feature-selection process. For example, during an initial iteration of the feedback-assisted feature-selection process, the feedback-assisted optimization model 104D does not yet have any performance information 1007 to utilize. Accordingly, in various embodiments, the candidate feature set 1001 in the initial iteration of the feedback-assisted feature-selection process is a selection of features 302 based on a solution to the objective function utilized by the feedback-assisted optimization model 104D (e.g., the objective function described above with reference to Equation 4) without any feedback component. During subsequent iterations of the feedback-assisted feature-selection process, the candidate feature set 1001 is selected based on feedback from a performance of a machine learning model 1005 that was trained based on a candidate feature set 1001 selected during a previous iteration of the process. In various embodiments, this process may be repeated for any suitable number of iterations, for example until the performance of a machine learning model 1005 generated based on the candidate feature sets 1001 meets or exceeds desired performance goals (e.g., as measured by log-loss scores, accuracy, or any other suitable performance metric).

FIG. 10 further includes training dataset generation module 1002, which, in various embodiments is operable to generate an updated training dataset 1003 based on the candidate feature set 1001. For example, in some embodiments, the updated training dataset 1003 includes only those features 302 that are specified in the candidate feature set 1001 (e.g., by removing those features 302 that are not included in the candidate feature set 1001). In the embodiment depicted in FIG. 10, the training dataset generation module 1002 generates the updated training dataset 1003 based on the training dataset 110. Note, however, that this embodiment is provided merely as one non-limiting example and, in other embodiments, the training dataset generation module 1002 is operable to generate the updated training dataset 1003 based on any of various suitable training datasets.

In FIG. 10, block diagram 1000 further includes training module 1004, which, in various embodiments, is operable to train one or more machine learning models 1005 based on the updated training dataset 1003. The machine learning models 1005 may be any of various suitable types of machine learning models, according to various embodiments. As non-limiting examples, in some embodiments the machine learning models 1005 may be artificial neural networks ("ANNs"), decision trees, logistic regression models, etc., or ensemble models that combine multiple different types of machine learning models. In various embodiments, the machine learning models 1005 may be classification or regression models, as desired. Note that, in various embodiments, the training module 1004 uses the same training techniques across the different iterations of the feedback-assisted feature-selection process such that a machine learning model 1005A generated during a first iteration of the process and a machine learning model 1005B generated during a second iteration of the process are generated using the same machine learning techniques. In training the various machine learning models, the training module 1004 may using any of various suitable machine learning libraries, including Pandas™, scikit-Learn™, TensorFlow™, or any other suitable machine learning library FIG. 10 further includes model evaluation module 1006, which, in various embodiments, is operable to evaluate the performance of the machine learning models 1005 across multiple different test splits of test dataset 1010. In various embodiments, test dataset 1010 may include various test data samples 1012A-1012N and the model evaluation module 1006 may evaluate the performance of the machine learning model 1005 on multiple different subsets (also referred to herein as "splits") of the test dataset 1010. As one non-limiting example, consider an instance in which the test dataset 1010 includes 1,000 test data samples 1012. In some such embodiments, multiple (e.g., two, four, ten, etc.) different test splits may be used to test the performance of the machine learning model 1005. In one non-limiting embodiment, for example, the model evaluation module 1006 may test the machine learning model 1005 based on four test splits of test dataset 1010, each of which includes 250 test data samples 1012. Note, however, that this embodiment is provided merely as one non-limiting example and, in other embodiments, the model evaluation module 1006 may test the machine learning model 1005 based on any suitable number of test splits containing any suitable number of test data samples 1012, as desired.

Further, note that, in some embodiments, the test dataset 1010 itself may be a subset of the training dataset 110. For example, in some embodiments the training dataset may include a relatively large number (e.g., 10,000) of data samples 112 and a first subset (e.g., 9,000) of the data samples 112 may be used to train the machine learning model 1005 while a second subset (e.g., 1,000) of the data samples 112 may be used as the test dataset 1010. Not that, in some such embodiments, the selection of data samples 112 used to train the machine learning model 1005 and to test the machine learning model 1005 may vary between iterations of the feedback-assisted feature-selection process.

Note that the model evaluation module 1006 may evaluate the machine learning model 1005 using various suitable metrics. In one non-limiting embodiment, for example, the model evaluation module 1006 may calculate the log-loss scores for the machine learning model 1005 across multiple different test splits and, based on these log-loss scores, calculate the variance of the log-loss scores of the machine learning model 1005 across the test splits. In some such embodiments this variance metric may be included in the performance information 1007 that is fed back into the feedback-assisted optimization model 104D. Note, however, that this example is provided merely as one non-limiting example and, in other embodiments, the performance information 1007 may include any other suitable performance metric, such as accuracy, precision, recall, f1, etc. Note that, in various embodiments, the model evaluation module 1006 may include multiple different performance metrics in the performance information 1007. Further note that the performance metric(s) used to evaluate the machine learning model 1005 may vary, according to some embodiments, based on the type of the machine learning model 1005. For example, in some embodiments the model evaluation module 1006 may calculate different performance metrics in instances in which the machine learning model 1005 is a classification model than in instances in which the machine learning model 1005 is a regression model.

As shown in FIG. 10, once generated by the model evaluation module 1006, the performance information 1007 may be fed back into and utilized by the feedback-assisted optimization model 104D. As one non-limiting example, in some embodiments the feedback-assisted optimization model 104D may utilize the performance information to determine whether to apply a penalty term to the objective function utilized by the feedback-assisted optimization model 104D. In some such embodiments, for example, the objective function may apply a penalty term in instances in which the variance in log-loss scores (or, in some embodiments, accuracy scores) across the different test splits exceeds some threshold level. Note, however, that this embodiment is provided merely as one non-limiting example and, in other embodiments, the feedback-assisted optimization model 104D may utilize the performance information in other ways.

Additionally, the disclosed techniques utilize a multi-objective optimization-based QUBO formulation such as Goal programming (GP) and Pareto optimal sets (POS). GP divides the multi-criteria objective function into multiple goals. It starts by optimizing one goal and, conditioned on that, optimizes other goals. POS looks at multiple goals and simultaneously finds paretos or fronts with similar performance across the multiple goals. In our case, our goals in feature-selection are "minimize redundancy," "maximize relevancy," and "reduce variance." Note that, in various embodiments, the disclosed feedback-assisted optimization model 104D, which takes feedback from the classifier used for model evaluation, provide subsets of features with better performance scores and provides a dynamic approach to understanding ATO and fraud using goal programming.

Referring now to FIG. 11, a flow diagram illustrating an example method 1100 for performing feature-selection based on a feedback-assisted optimization model is depicted, according to some embodiments. In various embodiments, method 1100 may be used to select, from a set of features 302A-302M, a reduced feature set for a training dataset 110. In various embodiments, a training dataset (e.g., training dataset 110 or another training dataset) that includes data values for this reduced feature set may be used to train one or more machine learning models. In some non-limiting embodiments, some or all of method 1100 may be performed by a computer system (e.g., a server system) that includes a quantum computing system (e.g., quantum computing system 106 of FIG. 1), where the computer system includes (or has access to) a non-transitory, computer-readable medium having program instructions stored thereon that are executable by the computer system to cause some or all of the operations described with reference to FIG. 11. In other non-limiting embodiments, some or all of method 1100 may be performed by a computer system that has access to quantum computing system (e.g., quantum computing system 106), for example as part of a cloud-based quantum computing service. In FIG. 11, method 1100 includes elements 1102-1106. While these elements are shown in a particular order for ease of understanding, other orders may be used. In various embodiments, some of the method elements may be performed concurrently, in a different order than shown, or may be omitted. Additional method elements may also be performed as desired.

At 1102, in the illustrated embodiment, the computer system accesses a training dataset that includes a plurality of data samples that include data values for a plurality of features, and a set of labels corresponding to the plurality of data samples. For example, quantum computing system 106 may access the training dataset 110 that includes data samples 112A-112N. As discussed above with reference to FIG. 2, in various embodiments the data samples 112 have corresponding labels 204, which, in some embodiments, indicate a class into which the corresponding data samples 112 have been classified.

At 1104, in the illustrated embodiment, the computer system performs a feature-selection operation to select, from the plurality of features, a subset of features to include in a reduced feature set. In the depicted embodiment the feature-selection process includes processing the training dataset based on an optimization model (e.g., a QUBO model), where an objective function utilized in the optimization model utilizes performance feedback information corresponding to machine learning models that are trained based on candidate feature sets. For example, in some embodiments performing the feature-selection operation includes identifying a first candidate feature set 1001A based on a first iteration of the feature-selection operation, receiving first performance feedback information (e.g., performance information 1007A) corresponding to a performance of a first machine learning model 1005A trained based on the first candidate feature set 1001A, and, based on the first performance feedback information, modifying a penalty term in the objective function. As noted above, in some embodiments the first performance information corresponds to a variance in an accuracy of the first machine learning model 1005A across a plurality of test splits, though, in other embodiments, the first performance information may include other items of information (e.g., a variance in log-loss scores) instead of (or in addition to) this accuracy information. In various embodiments, modifying the penalty term in the objective function includes applying a penalty value to the objective function in response to a determination that the variance in accuracy exceeds a particular threshold value.

Note that, in various embodiments, processing the training dataset using the optimization model at 1104 may include utilizing multi-objective optimization based on goal programming, for example by dividing the objective function into a plurality of goals, optimizing a first one of the plurality of goals, and, based on the optimization of the first goal, optimizing one or more additional goals from the plurality of goals in the objective function. In other embodiments, processing the training dataset using the optimization model at 1104 includes using multi-objective optimization based on Pareto optimal sets, including by analyzing a plurality of goals of the objective function and identifying a plurality of Pareto fronts having corresponding performances across the plurality of goals. In embodiments in which element 1104 utilizes multi-objective optimization, the plurality of goals may include one or more of the following goals: minimization of redundancy between features in the reduced feature set, maximization of relevancy between the features in the reduced feature set, reduction of variance in test scores generated during a testing of the reduced feature set using a plurality of different test splits, or any combination thereof.

At 1106, in the illustrated embodiment, the computer system, based on the feature-selection operation, generates an output value that indicates the subset of the plurality of features to include in the reduced feature set. In some embodiments, for example, the output value includes ground state spin information 113 that corresponds to a minimization of the objective function utilized in the optimization model. Further, in some embodiments, method 1100 includes determining the ground state spin information using quantum annealing, as described in detail above.

As noted above, in various embodiments the feedback-assisted optimization model 104D may be combined with any of the other optimization models described herein, as desired. For example, in some embodiments the feedback-assisted optimization model 104D utilizes the multivariate effect optimization model 104A that selects the subset of feature that maximizes a measure of relevancy between pairs of the features 302 and the set of labels 204 for the data samples 112. In other embodiments, however, the feedback-assisted optimization model 104D may utilize a MT-MI optimization model 104B, a hybrid optimization model 104C, a feature-ranking based optimization model 104E (described below), or any combination thereof.

In some embodiments, method 1100 further includes using the reduced feature set to train a machine learning model. For example, in some embodiments method 1100 further includes generating an updated training dataset that includes data values for the subset of features that are included in the reduced feature set, where the updated training dataset does not include second data values for one or more of the plurality of features that are not included in the reduced feature set, and then training a machine learning model based on the updated training dataset. In various embodiments, this machine learning model may be used for various purposes, such as identifying ATO attacks or other forms of fraudulent or malicious activity on a server system.

Example Embodiments

The following numbered clauses present a set ("Set D") of various non-limiting embodiments disclosed herein:

D1. A method, comprising:
  accessing, by a computer system, a training dataset that includes:
    a plurality of data samples that include data values for a plurality of features; and
    a set of labels corresponding to the plurality of data samples;
  performing, by the computer system, a feature-selection operation to select, from the plurality of features, a subset of features to include in a reduced feature set, wherein the feature-selection operation includes processing the training dataset based on an optimization model, and wherein an objective function utilized in the optimization model utilizes performance feedback information corresponding to machine learning models that are trained based on candidate feature sets; and
  based on the feature-selection operation, generating, by the computer system, an output value that indicates the subset of features to include in the reduced feature set.

D2. The method of clause D1, wherein the optimization model is a quadratic unconstrained binary optimization ("QUBO") model, wherein the output value includes ground state spin information that corresponds to a minimization of the objective function utilized in the QUBO model, wherein the processing the training dataset includes:
  determining the ground state spin information using quantum annealing.

D3. The method of any of clauses D1-D2, wherein the performing the feature-selection operation further includes:
  identifying a first candidate feature set based on a first iteration of the feature-selection operation;
  receiving first performance feedback information corresponding to a performance of a first machine learning model trained based on the first candidate feature set; and
  based on the first performance feedback information, modifying a penalty term in the objective function.

D4. The method of clause D3, wherein the first performance feedback information corresponds to a variance in an accuracy of the first machine learning model across a plurality of test splits.

D5. The method of clause D4, wherein the modifying the penalty term in the objective function includes:

applying a penalty value to the objective function in response to a determination that the variance in accuracy exceeds a particular threshold value; and wherein the method further comprises performing an additional iteration of the feature-selection operation to select the reduced feature set.

D6. The method of any of clauses D1-D5, wherein the processing the training dataset based on the optimization model includes selecting the subset of features that maximizes a measure of relevancy between pairs of the plurality of features and the set of labels for the plurality of data samples.

D7. The method of any of clauses D1-D6, wherein the processing the training dataset based on the optimization model includes using multi-objective optimization based on goal programming, including by:

dividing the objective function into a plurality of goals;

optimizing a first one of the plurality of goals; and based on the optimization of the first goal, optimizing one or more additional goals from the plurality of goals in the objective function.

D8. The method of any of clauses D1-D6, wherein the processing the training dataset based on the optimization model includes using multi-objective optimization based on Pareto optimal sets, including by:

analyzing a plurality of goals of the objective function; and identifying a plurality of Pareto fronts having corresponding performances across the plurality of goals.

D9. The method of either of clauses D7 or D8, wherein the plurality of goals includes one or more of the following goals:

minimization of redundancy between features in the reduced feature set;

maximization of relevance between the features in the reduced feature set; and reduction of variance in test scores generated during a testing of the reduced feature set using a plurality of different test splits.

D10. The method of any of clauses D1-D9, further comprising:

generating, by the computer system, an updated training dataset that includes data values for the subset of features that are included in the reduced feature set, wherein the updated training dataset does not include second data values for one or more of the plurality of features that are not included in the reduced feature set; and training, by the computer system, a machine learning model based on the updated training dataset.

D11. A method, comprising:

performing, by a computer system, a feature-selection operation to select, from a plurality of features, a subset of features to include in a reduced feature set, wherein the feature-selection operation is based on a optimization model that utilizes performance feedback information corresponding to machine learning models that are trained based on candidate feature sets; and generating, by the computer system, an output value based on the feature-selection operation, wherein the output value indicates the subset of features to include in the reduced feature set.

D12. The method of clause D11, wherein the optimization model is a QUBO model, wherein the output value includes ground state spin information that corresponds to a minimization of an objective function utilized in the QUBO model, wherein the feature-selection operation includes processing a training dataset based on the QUBO model and includes:

determining the ground state spin information using quantum annealing.

D13. The method of clause D12, wherein the performing the feature-selection operation further includes:

identifying a first candidate feature set based on a first iteration of the feature-selection operation;

receiving first performance feedback information corresponding to a performance of a first machine learning model trained based on the first candidate feature set; and based on the first performance feedback information, modifying a penalty term in the objective function.

D14. The method of clause D13, wherein the first performance feedback information is based on log-loss scores for the first machine learning model across a plurality of test splits of a test dataset.

D15. The method of clause D14, wherein the modifying the penalty term in the objective function includes applying a penalty value to the objective function in response to a determination that a variance in the log-loss scores the first machine learning model exceeds a particular threshold value.

D16. A non-transitory, computer-readable medium having program instructions stored thereon that are executable by one or more computer systems to perform operations as recited in the method of any of clauses D1-D15.

D17. A system, comprising:

at least one processor coupled to the non-transitory, computer-readable medium of clause D16.

Feature-Ranking-Based QUBO Models

In the feature-selection techniques described above, the reduced feature set information 114 has been described in terms of variables X that have binary values indicating whether the corresponding features 302 are selected for inclusion in the reduced feature set. In some embodiments, in addition to determining which features are to be included in the reduced feature set, it may also be desirable to know a relative importance of the features. Accordingly, in various embodiments, the disclosed techniques include utilizing an optimization model 104E that is usable to generate reduced feature set information 114 that includes weighting values (e.g., floating point values or integers) that correspond to a relative ranking of the features 302.

Figure 12:
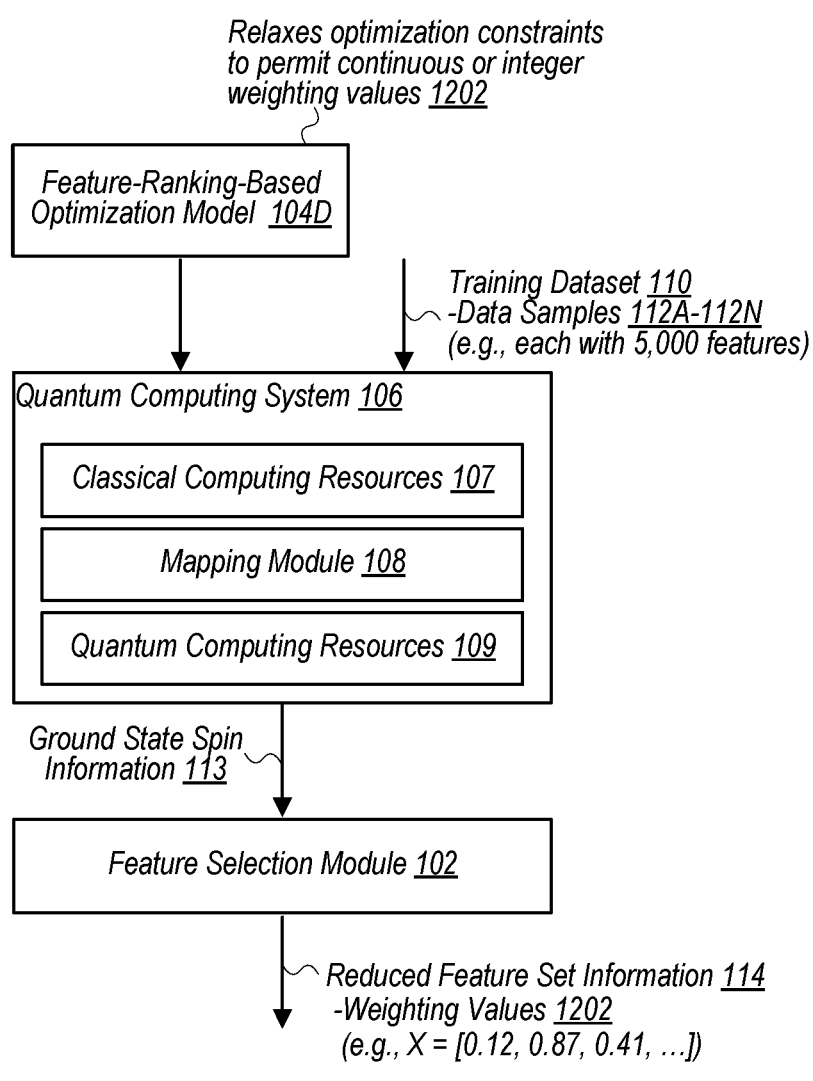
FIG. 12 is a block diagram illustrating an example feature-ranking-based optimization model, according to some embodiments.

Referring now to FIG. 12, block diagram 1200 depicts an example system in which feature-ranking based optimization model 104E is used in a feature-selection process to select a reduced feature set for use, for example, in training one or more machine learning models, according to various embodiments.

In the depicted embodiment, the quantum computing system 106 is provided with feature-ranking based optimization model 104E and a dataset 110 that includes data samples 112A-112N. In various embodiments, the feature-ranking based optimization model 104E may utilize an objective function $f(x)$ of the following form:

$$f(x) = X^T Q X + \|X\|_{reg} \tag{7}$$

where Q incorporates the relevancy, redundancy, and other factors (such as score variance on test splits), the vector $X := \{X_1, X_2, \ldots, X_n\}$ such that $X_i \in \mathbb{R}$ or in $\mathbb{Z}^+$, and $\|X\|_{reg}$ is a regularization term that incorporates one or more constraints (e.g., number of features 302 to be selected for the reduced feature set, penalty terms, etc.). For example, in various embodiments, Q may be any of the previous optimization models 104A-104D discussed above.

As indicated in FIG. 12, in various embodiments the feature-ranking based optimization model 104E relaxes the optimization constraints to allow the search space for the weighting values 1202 to take values other than binary values (e.g., continuous or integer values, according to various embodiments). In various embodiments the quantum computing system 106 generates ground state spin information 113 based on the feature-ranking based optimization model 104E, as described in greater detail above. For example, in various embodiments feature-selection problem modeled using the feature-ranking based optimization model 104E is mapped to a target Hamiltonian representation using the quantum computing resources 109 of the quantum computing system 106. The quantum computing system 106 may then use quantum annealing to determine the ground state spin information 113 that corresponds to a solution to this feature-selection problem.

FIG. 12 further includes feature-selection module 102, which, in various embodiments, is operable to generate reduced feature set information 114 based on the ground state spin information 113. Note that, in various embodiments, the reduced feature set information 114 includes weighting values 1202 that indicate the relative importance of the various features 302. That is, in various embodiments, the weighting values 1202 indicate how important one feature 302 is compared to another, which provides an indication of the ranking of the features 302 relative to one another. In the non-limiting embodiment depicted in FIG. 12, for example, reduced feature set information 114 depicts three weighting values 1202A-1202C: weighting value 1202A of 0.12, which corresponds to feature 302A; weighting value 1202B of 0.87, which corresponds to feature 302B; and weighting value 1202C of 0.41, which corresponds to feature 302C. In this non-limiting embodiment, for example, the weighting values 1202 may be floating point values generated on a scale from 0.0 to 1.0 in which higher values indicate a higher degree of importance. Accordingly, in such embodiments, the weighting values 1202 may indicate that, between features 302A-302C, feature 302B is the most important, feature 302C is the next most important, and feature 302A is the least important of the three. Note, however, that this embodiment is provided merely as one non-limiting example and, in other embodiments, the weighting values 1202 may be provided on other ranges (e.g., from −10 to +10, 1 to 100, etc.) using other types of values (e.g., integers), as desired.

In some embodiments, the features 302 selected for inclusion in the reduced feature set may be determined based on the weighting values 1202. As one non-limiting example, in some embodiments the feature-selection module 102 may select those features 302 for which the corresponding weighting values 1202 exceed some particular threshold value (e.g., 0.85 in embodiments in which the weighting values 1202 are provided on a scale from 0.0-1.0). Continuing with the embodiment depicted in FIG. 12, as one non-limiting example, in an embodiment in which only features 302 for which the corresponding weighting values 1202 exceed 0.85 are selected for inclusion in the reduced feature set then, between features 302A-302C, only feature 302B would be included in the reduced feature set. Note that, in some embodiments, one or more constraints may be placed on the weighting values 1202, for example by having weighting values 1202 that sum up to equal a particular number (e.g., 1).

This approach may provide various technical benefits. For example, in some embodiments this approach enables feature ranking.

Turning now to FIG. 13, a flow diagram illustrating an example method 1300 for performing feature-selection based on a feature-ranking based optimization model is depicted, according to some embodiments. In various embodiments, method 1300 may be used to select, from a set of features 302A-302M, a reduced feature set for a training dataset 110. In various embodiments, a training dataset (e.g., training dataset 110 or another training dataset) that includes data values for this reduced feature set may be used to train one or more machine learning models. In some non-limiting embodiments, some or all of method 1300 may be performed by a computer system (e.g., a server system) that includes a quantum computing system (e.g., quantum computing system 106 of FIG. 1), where the computer system includes (or has access to) a non-transitory, computer-readable medium having program instructions stored thereon that are executable by the computer system to cause some or all of the operations described with reference to FIG. 13. In other non-limiting embodiments, some or all of method 1300 may be performed by a computer system that has access to quantum computing system (e.g., quantum computing system 106), for example as part of a cloud-based quantum computing service. In FIG. 13, method 1300 includes elements 1302-1304. While these elements are shown in a particular order for ease of understanding, other orders may be used. In various embodiments, some of the method elements may be performed concurrently, in a different order than shown, or may be omitted. Additional method elements may also be performed as desired.

At 1302, in the illustrated embodiment, the computer system accesses a training dataset that includes a plurality of data samples that include data values for a plurality of features, and a set of labels corresponding to the plurality of data samples. For example, quantum computing system 106 may access the training dataset 110 that includes data samples 112A-112N. As discussed above with reference to FIG. 2, in various embodiments the data samples 112 have corresponding labels 204, which, in some embodiments, indicate a class into which the corresponding data samples 112 have been classified.

At 1304, in the illustrated embodiment, the computer system processes the training dataset using a feature-ranking based optimization model to generate weighting values for the plurality of features, where processing the training dataset includes using quantum annealing to determine a minimization of an objective function utilized in the feature-ranking based optimization model. In various embodiments, the minimization of the objective function corresponds to an output value (e.g., a vector) that indicates the weighting values for the plurality of features. Note that, in various embodiments, the weighting values correspond to a relative ranking of the plurality of features. In some embodiments, the weighting values for the plurality of features are continuous values (or integer values) provided within a particular range, where a magnitude of a given weighting value indicates a relative importance of a corresponding one of the plurality of features.

As described above with reference to FIG. 12, the feature-ranking based optimization model (e.g., model 104E) may utilize aspects of various other optimization models 104A-104D described herein combined in any of various suitable manners. In some embodiments, for example, the feature ranking based optimization model 104E may utilize aspects of the MT-MI optimization model 104B such that the feature-ranking based optimization model 104E evaluates a measure of mutual information between groups of two or more features and the set of labels for the plurality of data samples and evaluates a measure of conditional mutual information between a first feature and the set of labels for the plurality of features provided that a group of two or more other features are also selected for inclusion in the reduced feature set. In some embodiments, the feature ranking based optimization model 104E may utilize aspects of the multivariate effects optimization model 104A such that the feature ranking based optimization model 104E evaluates the relevancy between pairs of the plurality of features and the set of labels for the plurality of data samples, and evaluates the redundancy between groups of three or more of the plurality of features. Further, in some embodiments, the feature ranking based optimization model 104E may utilize aspects of the feedback-assisted optimization model 104D. For example, in some embodiments, an objective function utilized in the feature-ranking based optimization model 104E may utilize performance feedback information corresponding to machine learning models that are trained based on candidate feature sets, as described in more detail above with reference to FIG. 10. Additionally, in some embodiments, the feature ranking based optimization model 104E may be an ensemble model that utilizes aspects of multiple different optimization models 104A-104D. For example, in some embodiments, the feature ranking based optimization model 104E utilizes elements of the multivariate effect optimization model 104A, the MT-MI optimization model 104B, the feedback-assisted optimization model 104D, the feature-ranking based optimization model 104E, or any combination thereof.

In various embodiments, method 1300 further includes, based on the weighting values, selecting a subset of features, from the plurality of features, to include in a reduced feature set. For example, for a particular one of the plurality of features, the selecting, according to some embodiments, includes comparing a particular weighting value for the particular feature to a threshold value and, in response to the particular weighting value not meeting (or not exceeding) the particular threshold value, excluding the particular feature from the reduced feature set.

Note that, in various embodiments, the reduced feature set selected based on the feature ranking based optimization model 104E may be used to train one or more machine learning models. For example, in some embodiments, method 1300 further includes, based on the weighting values, generating an updated training dataset that includes data values for a subset of features that are included in a reduced feature set, where the updated training dataset does not include second data values for one or more of the plurality of features that are not included in the reduced feature set, and training a machine learning model based on the updated training dataset.

Example Embodiments

The following numbered clauses present a set ("Set E") of various non-limiting embodiments disclosed herein:

E1. A method, comprising:
 accessing, by a computer system, a training dataset that includes:
  a plurality of data samples that include data values for a plurality of features; and a set of labels corresponding to the plurality of data samples; and
 processing, by the computer system, the training dataset based on an optimization model to generate weighting values for the plurality of features, wherein the processing the training dataset includes using quantum annealing to determine a minimization of an objective function utilized in the optimization model, and wherein the minimization of the objective function corresponds to an output value that indicates the weighting values for the plurality of features.

E2. The method of clause E1, wherein the weighting values correspond to a relative ranking of the plurality of features; and wherein the method further comprises:
 based on the weighting values, selecting, from the plurality of features, a subset of features to include in a reduced feature set.

E3. The method of clause E2, wherein, for a particular one of the plurality of features, the selecting includes:
 comparing a particular one of the weighting values, for the particular feature, to a particular threshold value; and
 in response to the particular weighting value not meeting the particular threshold value, excluding the particular feature from the reduced feature set.

E4. The method of clause E2, wherein the optimization model is a quadratic unconstrained binary optimization ("QUBO") model that:
 evaluates a measure of mutual information between groups of two or more features and the set of labels for the plurality of data samples; and
 evaluates a measure of conditional mutual information between a first feature and the set of labels for the plurality of features provided that a group of two or more other features are selected for inclusion in the reduced feature set.

E5. The method of any of clauses E1-E4, wherein the optimization model is an ensemble model that further:
 evaluates a relevancy between pairs of the plurality of features and the set of labels for the plurality of data samples; and
 evaluates a redundancy between groups of three or more of the plurality of features.

E6. The method of any of clauses E1-E5, wherein the weighting values for the plurality of features are continuous values provided within a particular range, and wherein a magnitude of a given one of the weighting values indicates a relative ranking of a corresponding one of the plurality of features.

E7. The method of any of clauses E1-E6, further comprising:
 based on the weighting values, generating, by the computer system, an updated training dataset that includes data values for a subset of features that are included in a reduced feature set, wherein the updated training dataset does not include second data values for one or more of the plurality of features that are not included in the reduced feature set; and
 training, by the computer system, a machine learning model based on the updated training dataset.

E8. The method of any of clauses E1-E7, wherein the weighting values for the plurality of features are integer values provided within a particular range, and wherein a magnitude of a given one of the weighting values indicates a relative ranking of a corresponding one of the plurality of features.

E9. A method, comprising:

accessing, by a computer system, a training dataset that includes a plurality of data samples, wherein a given one of the plurality of data samples includes data values for a plurality of features;

performing, by the computer system, a feature selection operation to select, from the plurality of features, a reduced feature set for the training dataset, wherein the feature selection operation includes:

processing the training dataset using a feature-ranking-based optimization model to generate a ranking of the plurality of features;

subsequent to the feature selection operation, updating, by the computer system, the training dataset to remove data values for a subset of the plurality of features that are not included in the reduced feature set; and training, by the computer system, a machine learning model based on the updated training dataset.

E10. The method clause E9, wherein the ranking of the plurality of features is indicated using an output vector that includes a plurality of weighting values indicating a relative importance of the plurality of features.

E11. The method of either of clauses E9 or E10, wherein the feature-ranking-based optimization model is a QUBO model, and wherein the processing the training dataset includes using quantum annealing to determine a minimization of an objective function utilized in the QUBO model.

E12. The method of clause E10, wherein the plurality of weighting values for the plurality of features are continuous values provided within a particular range.

E13. The method of clause E10, wherein the weighting values for the plurality of features are integer values provided within a particular range.

E14. A non-transitory, computer-readable medium having program instructions stored thereon that are executable by one or more computer systems to perform operations as recited in the method of any of clauses E1-E13.

E15. A system, comprising:

at least one processor coupled to the non-transitory, computer-readable medium of clause E14.

Figure 14:
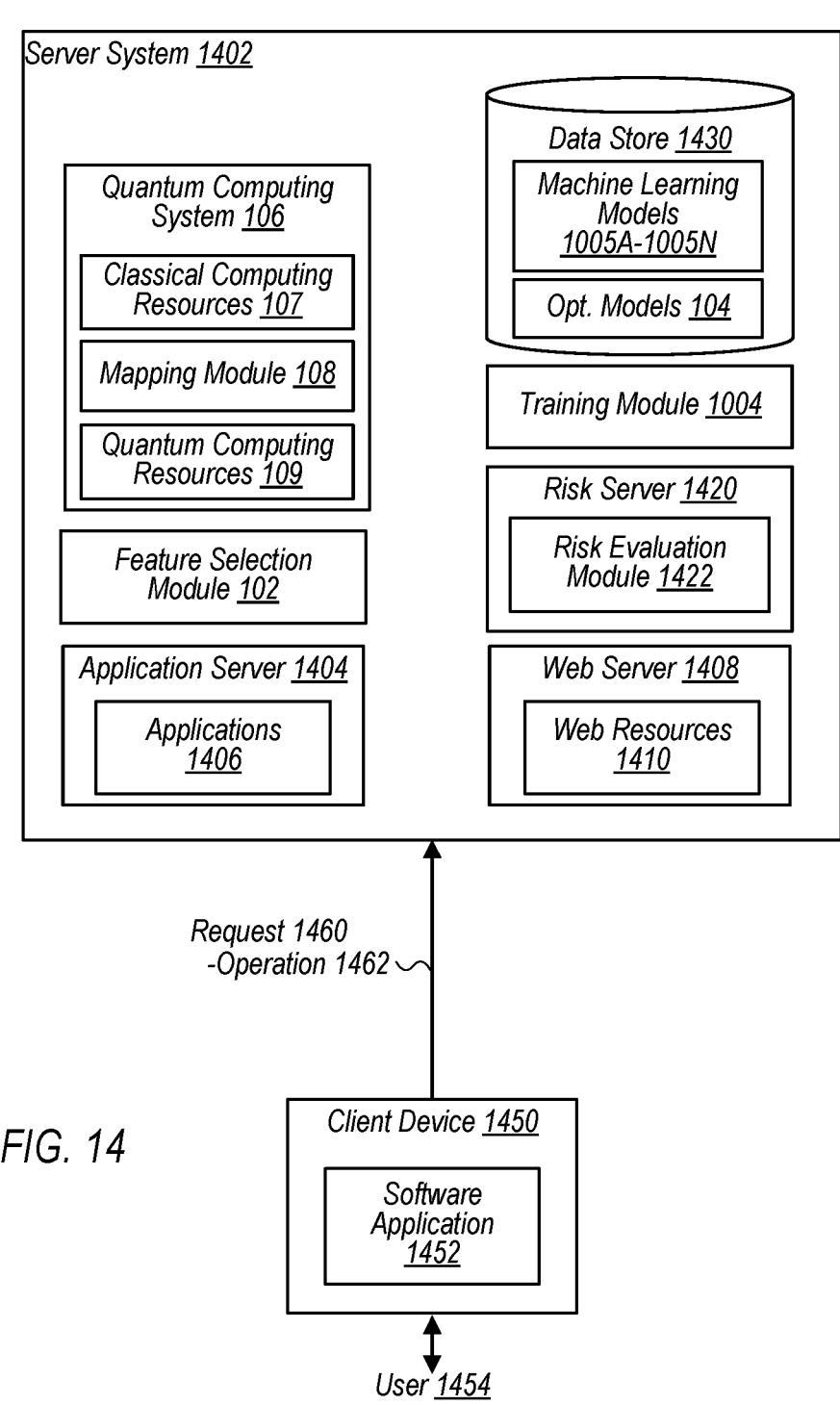
FIG. 14 is a block diagram illustrating an example server system that may utilize one or more machine learning models trained based on a reduced feature set selected using the disclosed techniques, according to some embodiments.

Referring now to FIG. 14, block diagram 1400 depicts a server system 1402 that includes application server 1404 hosting one or more software applications 1406, web server 1408 hosting one or more web resources 1410, data store 1430, and risk server 1420. In various embodiments, risk server 1420 is operable to utilize one or more machine learning models 1005A-1005N to determine whether to authorize a request 1460 to perform an operation 1462. As described in detail above, in various embodiments one or more of these machine learning models 1005 may be trained based on a reduced feature set that was selected using one or more of the disclosed optimization models 104.

In various embodiments, server system 1402 may provide one or more computing resources (e.g., as part of a web service) that may be used directly by end users or that may be integrated with (or otherwise used by) web services provided by third parties. As one non-limiting example, server system 1402, in some embodiments, provides an online payment service that may be used by end users to perform online financial transactions (e.g., sending or receiving funds) or utilized by merchants to receive funds from users during financial transactions. Note, however, that this embodiment is described merely as one non-limiting example. In other embodiments, server system 1402 may provide any of various suitable web services to end users, such as an email service, streaming media service, social media service, online retail store, etc. Additionally note that, in some embodiments, a "server system" (such as server system 1402, application server 1404, web server 1408, or risk server 1420) may be implemented using a single machine. In other embodiments, however, a "server system" may be implemented using multiple machines executing (e.g., at one or more datacenters) for the benefit of a single entity. For example, in some embodiments, one or more of server system 1402, application server 1404, web server 1408, or risk server 1420 may be implemented using multiple machines located at one or more datacenters.

FIG. 14 further includes client device 1450 operated by user 1454. Client device 1450 may be any of various suitable computing devices, such as a smartphone, laptop computer, desktop computer, tablet computer, etc. that user 1454 may use to access the service(s) provided via server system 1402. For example, in various embodiments, client device 1450 executes a software application 1452, such as a web browser or dedicated software application, usable to access one or more computing resources provided by application server 1404 or web server 1408.

In the depicted embodiment, user 1454 sends, via client device 1450, a request 1460 to the server system 1402 to perform an operation 1462. In various embodiments, the user 1454 may send the request 1460 via the software application 1452, which, as non-limiting examples, may be a web browser, a software application associated with a service provided via the server system 1402, a software application associated with a service provided by a third-party that utilizes one or more services provided via the server system 1402, etc. For example, in various embodiments the server system 1402 is operable to perform various different types of operations for a requesting user as part of the service(s) it provides. In the non-limiting embodiment in which the server system 1402 provides an online payment service, these operations may include transferring funds from one user account to another, logging into a user account, modifying a user's account information, etc. Note again, however, that this embodiment is provided merely as one non-limiting example and, in other embodiments server system 1402 may be operable to provide any suitable set of operations as part of the service(s) it provides.

In various embodiments, in response to the request 1460 to perform an operation 1462, the risk evaluation module 1422 may select one or more machine learning models 1005 for execution to assess the level of risk associated with the request 1460 and to determine whether to authorize the operation 1462. For example, as shown in FIG. 14, data store 1430 may store various machine learning models 1005 that may be used by the risk evaluation module 1422 to assess the level of risk associated with a requested operation 1462 and, based on that level of risk, determine whether to authorize the requested operation 1462. If, based on the output of the machine learning model 1005, the requested operation 1462 is not immediately authorized, the server system 1402 may take one or more appropriate actions, such as denying the request 1460, performing further risk analysis, requesting additional authentication operations (e.g., multi-factor authentication) from the user 1454, etc.

In the depicted embodiment, server system 1402 includes quantum computing system 106. In some such embodiments, the server system 10402 may use the quantum computing system 106 to perform one or more aspects of the disclosed feature-selection techniques, as described above. Note, however, that this embodiment is provided merely as one non-limiting example and, in other embodiments, quantum computing system 106 may be included in a third-party system. For example, in some embodiments the quantum computing system may be included in a third-party system that provides quantum computing resources as a service. In some such embodiments, one or more aspects of the disclosed feature-selection techniques may be performed by the quantum computing system 106 at the third-party system. As one non-limiting example, in some such embodiments the server system 1402 may send one or more optimization models 104 and (optionally) one or more training datasets 110 to the third-party system, where the optimization model (s) 104 are mapped to a target Hamiltonian, the quantum computing resources 109 determine a minimization to the objective function utilized by the optimization model(s) 104, and the third-party system sends the ground state spin information 113 back to the server system 1402. In this non-limiting example, the feature-selection module 102 may then use this ground state spin information 113 to complete the feature-selection process and select the reduced feature set.

Example Computer System

Figure 15:
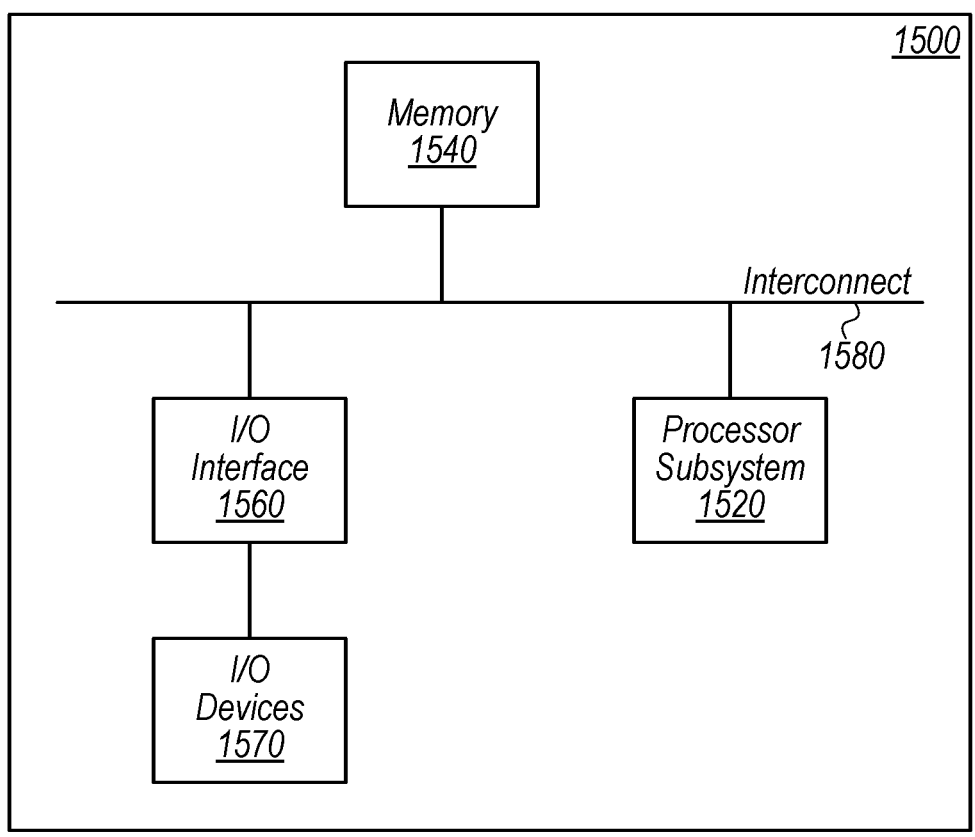
FIG. 15 is a block diagram illustrating an example computer system, according to some embodiments.

Referring now to FIG. 15, a block diagram of an example computer system 1500 is depicted, which may implement one or more computer systems, such as one or more of the computer systems within server system 1402 of FIG. 14, according to various embodiments. Computer system 1500 includes a processor subsystem 1520 that is coupled to a system memory 1540 and I/O interfaces(s) 1560 via an interconnect 1580 (e.g., a system bus). I/O interface(s) 1560 is coupled to one or more I/O devices 1570. Computer system 1500 may be any of various types of devices, including, but not limited to, a server computer system, personal computer system, desktop computer, laptop or notebook computer, mainframe computer system, server computer system operating in a datacenter facility, handheld computer, workstation, network computer, etc. Although a single computer system 1500 is shown in FIG. 15 for convenience, computer system 1500 may also be implemented as two or more computer systems operating together.

Processor subsystem 1520 may include one or more processors or processing units. In various embodiments of computer system 1500, multiple instances of processor subsystem 1520 may be coupled to interconnect 1580. In various embodiments, processor subsystem 1520 (or each processor unit within 1520) may contain a cache or other form of on-board memory.

System memory 1540 is usable to store program instructions executable by processor subsystem 1520 to cause system 1500 perform various operations described herein. System memory 1540 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1500 is not limited to primary storage such as system memory 1540. Rather, computer system 1500 may also include other forms of storage such as cache memory in processor subsystem 1520 and secondary storage on I/O devices 1570 (e.g., a hard drive, storage array, etc.). In some embodiments, these other forms of storage may also store program instructions executable by processor subsystem 1520.

I/O interfaces 1560 may be any of various types of interfaces configured to couple to and communicate with other devices, according to various embodiments. In one embodiment, I/O interface 1560 is a bridge chip (e.g., Southbridge) from a front-side to one or more back-side buses. I/O interfaces 1560 may be coupled to one or more I/O devices 1570 via one or more corresponding buses or other interfaces. Examples of I/O devices 1570 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1570 includes a network interface device (e.g., configured to communicate over WiFi, Bluetooth, Ethernet, etc.), and computer system 1500 is coupled to a network via the network interface device.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail (e.g., feature-selection module 102, training dataset generation module 1002, training module 1004, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:

accessing, by a computer system, a training dataset that includes:

a plurality of data samples that include data values for a plurality of features; and a set of labels corresponding to the plurality of data samples;

performing, by the computer system, a feature-selection operation to select, from the plurality of features, a subset of features to include in a reduced feature set, wherein the feature-selection operation includes:

executing trained machine learning models that are trained based on candidate feature subsets;

generating performance feedback information based on output of the trained machine learning models for the candidate feature subsets, wherein the performance feedback information indicates at least variance in an accuracy of the trained machine learning models across the candidate feature subsets; and processing the training dataset using quantum computing based on an optimization model, including executing an objective function, utilized in the optimization model, using at least the performance feedback information; and generating, by the computer system, an updated training dataset that includes only the subset of features, wherein the generating is performed based on the feature-selection operation:

applying a penalty value to the objective function in response to a determination that the variance in accuracy exceeds a particular threshold value; and indicating ground state spin information determined using the quantum computing; and evaluating a risk associated with a requested operation by executing the trained machine learning models to obtain an output; and denying the requested operation or requesting user authentication operations based on the output.

2. The method of claim 1, wherein the optimization model is a quadratic unconstrained binary optimization ("QUBO") model, wherein the output includes ground state spin information that corresponds to a minimization of the objective function utilized in the QUBO model.

3. The method of claim 1, wherein performing the feature-selection operation further includes:

identifying a first candidate feature set based on a first iteration of the feature-selection operation;

receiving first performance feedback information corresponding to a performance of a first machine learning model trained based on the first candidate feature set; and based on the first performance feedback information, modifying a penalty term in the objective function.

4. The method of claim 1, wherein performing the feature-selection operation further includes:

calculating log-loss scores for the trained machine learning models based on output of the trained machine learning models across a plurality of test splits; and calculating, based on the log-loss scores, the variance in the accuracy of the one or more of the trained machine learning models.

5. The method of claim 3, wherein the method further comprises performing an additional iteration of the feature-selection operation to select the reduced feature set.

6. The method of claim 1, wherein the processing the training dataset based on the optimization model includes selecting the subset of features that maximizes a measure of relevancy between pairs of the plurality of features and the set of labels for the plurality of data samples.

7. The method of claim 1, wherein processing the training dataset based on the optimization model includes using multi-objective optimization based on goal programming, including by:

dividing the objective function into a plurality of goals;

optimizing a first one of the plurality of goals; and based on the optimization of the first one of the plurality of goals, optimizing one or more additional goals from the plurality of goals in the objective function.

8. The method of claim 1, wherein processing the training dataset based on the optimization model includes using multi-objective optimization based on Pareto optimal sets, including by:

analyzing a plurality of goals of the objective function; and identifying a plurality of Pareto fronts having corresponding performances across the plurality of goals.

9. The method of claim 8, wherein the plurality of goals includes one or more of the following goals:

minimization of redundancy between features in the reduced feature set;

maximization of relevance between the features in the reduced feature set; and reduction of variance in test scores generated during a testing of the reduced feature set using a plurality of different test splits.

10. The method of claim 1, further comprising:

generating, by the computer system, an updated training dataset that includes data values for the subset of features that are included in the reduced feature set, wherein the updated training dataset does not include second data values for one or more of the plurality of features that are not included in the reduced feature set; and training, by the computer system, a machine learning model based on the updated training dataset.

11. A non-transitory, computer-readable medium having instructions stored thereon that are executable by a computer system to perform operations comprising:

accessing a training dataset that includes:

a plurality of data samples that include data values for a plurality of features;

and a set of labels corresponding to the plurality of data samples;

performing a feature-selection operation to select, from the plurality of features, a subset of features to include in a reduced feature set, wherein the feature-selection operation includes:

executing trained machine learning models that are trained based on candidate feature subsets;

generating performance feedback information based on output of the trained machine learning models for the candidate feature subsets, wherein the performance feedback information indicates at least variance in an accuracy of the trained machine learning models across the candidate feature subsets; and processing the training dataset using quantum computing based on an optimization model, including executing an objective function, utilized in the optimization model, using at least the performance feedback information; and generating an updated training dataset that includes only the subset of features, wherein the generating is performed based on the feature-selection operation:

applying a penalty value to the objective function in response to a determination that the variance in accuracy exceeds a particular threshold value; and indicating ground state spin information determined using the quantum computing; and evaluating a risk associated with a requested operation by executing the trained machine learning models to obtain an output; and denying the requested operation or requesting user authentication operations based on the output.

12. The non-transitory, computer-readable medium of claim 11, wherein performing the feature-selection operation further includes:

identifying a first candidate feature set based on a first iteration of the feature-selection operation;

receiving first performance feedback information corresponding to a performance of a first machine learning model trained based on the first candidate feature set; and based on the first performance feedback information, modifying a penalty term in the objective function.

13. The non-transitory, computer-readable medium of claim 12, wherein the variance is determined based on log-loss scores for the first machine learning model across a plurality of test splits.

14. The non-transitory, computer-readable medium of claim 13, wherein modifying the penalty term in the objective function includes:

applying a penalty value to the objective function in response to a determination that the variance in log-loss scores is above a particular threshold value; and wherein the operations further comprise performing an additional iteration of the feature-selection operation to select the reduced feature set.

15. The non-transitory, computer-readable medium of claim 11, wherein the operations further comprise:

generating an updated training dataset that includes data values for the subset of features that are included in the reduced feature set, wherein the updated training dataset does not include second data values for one or more of the plurality of features that are not included in the reduced feature set; and training a machine learning model based on the updated training dataset.

16. A method, comprising:

performing, by a computer system, a feature-selection operation to select, from a plurality of features, a subset of features to include in a reduced feature set, wherein the feature-selection operation includes:

executing trained machine learning models that are trained based on candidate feature subsets;

generating performance feedback information based on output of the trained machine learning models for the candidate feature subsets, wherein the performance feedback information indicates at least variance in an accuracy of the trained machine learning models across the candidate feature subsets; and processing the plurality of features using quantum computing based on an optimization model, including executing an objective function, utilized in the optimization model, using at least the performance feedback information; and generating, by the computer system, updated training dataset that includes only the subset of features, wherein the generating is performed based on the feature-selection operation:

applying a penalty value to the objective function in response to a determination that the variance in accuracy exceeds a particular threshold value; and indicating ground state spin information determined using the quantum computing; and evaluating a risk associated with a requested operation by executing the trained machine learning models to obtain an output; and denying the requested operation or requesting user authentication operations based on the output.

17. The method of claim 16, wherein the optimization model is a QUBO model, wherein the output includes ground state spin information that corresponds to a minimization of the objective function utilized in the QUBO model, wherein the feature-selection operation includes processing a training dataset based on the QUBO model.

18. The method of claim 17, wherein the performing the feature-selection operation further includes:

identifying a first candidate feature set based on a first iteration of the feature-selection operation;

receiving first performance feedback information corresponding to a performance of a first machine learning model trained based on the first candidate feature set; and based on the first performance feedback information, modifying a penalty term in the objective function.

19. The method of claim 16, wherein performing the feature-selection operation further includes:

calculating log-loss scores for the performance of trained machine learning models across a plurality of test splits; and calculating, based on the log-loss scores, the variance in performance of the trained machine learning models.

20. The method of claim 18, wherein modifying the penalty term in the objective function includes applying a penalty value to the objective function in response to a determination that a variance in log-loss scores for the first machine learning model exceeds a particular threshold value.

* * * * *